(12) United States Patent
Weippert et al.

(10) Patent No.: US 11,794,428 B2
(45) Date of Patent: Oct. 24, 2023

(54) INKJET METHOD FOR PRODUCING A SPECTACLE LENS

(71) Applicant: Carl Zeiss Vision International GmbH, Aalen (DE)

(72) Inventors: Hans-Joachim Weippert, Aalen (DE); Matthias Krieg, Heidenheim (DE); Jörg Pütz, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 17/860,408

(22) Filed: Jul. 8, 2022

(65) Prior Publication Data

US 2022/0347951 A1 Nov. 3, 2022

Related U.S. Application Data

(63) Continuation of application No. PCT/EP2021/050394, filed on Jan. 11, 2021.

(30) Foreign Application Priority Data

Jan. 10, 2020 (EP) ..................................... 20151152

(51) Int. Cl.
| | | |
|---|---|---|
| B29D 11/00 | (2006.01) | |
| B29C 64/112 | (2017.01) | |
| B33Y 70/10 | (2020.01) | |
| C08G 59/14 | (2006.01) | |
| B33Y 10/00 | (2015.01) | |
| B29L 11/00 | (2006.01) | |

(52) U.S. Cl.
CPC ...... B29D 11/00355 (2013.01); B29C 64/112 (2017.08); B33Y 70/10 (2020.01); C08G 59/1483 (2013.01); *B29L 2011/0016* (2013.01); *B33Y 10/00* (2014.12)

(58) Field of Classification Search
CPC . B29D 11/00355; B29C 64/112; B33Y 70/10; B33Y 10/00; C08G 59/1483; B29L 2011/0016
See application file for complete search history.

(56) References Cited

U.S. PATENT DOCUMENTS

| | | | |
|---|---|---|---|
| 7,549,742 | B2 | 6/2009 | Doshi |
| 7,728,962 | B2 | 6/2010 | Hornauer et al. |
| 8,137,892 | B2 | 3/2012 | Shimizu et al. |
| 8,503,080 | B2 | 8/2013 | Seesselberg et al. |
| 10,179,831 | B2 | 1/2019 | Weippert |
| 2004/0008319 | A1 | 1/2004 | Lai et al. |
| 2005/0046957 | A1 | 3/2005 | Lai et al. |
| 2016/0167323 | A1* | 6/2016 | Valeri ............. B29D 11/00432 264/2.6 |
| 2018/0354249 | A1 | 12/2018 | Martinez De Leon et al. |
| 2022/0218600 | A1 | 7/2022 | Doshi |

FOREIGN PATENT DOCUMENTS

| | | |
|---|---|---|
| CN | 107641200 A1 | 1/2018 |
| DE | 102012210185 A1 | 12/2013 |
| EP | 1674243 A2 | 6/2006 |
| EP | 1847377 A2 | 10/2007 |
| EP | 2093269 A1 | 8/2009 |
| EP | 2846983 A1 | 3/2015 |
| JP | 2011076105 A | 4/2011 |
| JP | 2015232707 A | 12/2015 |
| WO | 03033500 A1 | 4/2003 |
| WO | 2005017482 A1 | 2/2005 |
| WO | 2008119688 A1 | 10/2008 |
| WO | 2015121341 A1 | 5/2009 |
| WO | 2009056196 A1 | 8/2015 |
| WO | 2016176548 A1 | 11/2016 |

OTHER PUBLICATIONS

European Search Report issued in EP 20 151 152.4, to which this application claims priority, dated Jul. 17, 2020, and English-language translation thereof.
Office Action by the European Patent Office issued in EP 20 151 152.4, to which this application claims priority, dated Oct. 28, 2022, and English-language translation thereof.
Koeppen: "Konzeption und Entwicklung von Gleitsichtglaesem," DOZ, pp. 42-45, and English-language translation thereof, Oct. 1995.
"Ophthalmic optics—Spectacle lenses—Vocabulary (ISO 13666:2012)," German and English version EN ISO 13666:2012, Oct. 2013.
Code of Federal Regulations: § 801.410 Use of impact-resistant lenses in eyeglasses and sunglasses. Up to date as of Jun. 24, 2022.
Written opinion issued in PCT/EP2021/050394, to which this application claims priority, dated Apr. 1, 2021.
International Search Report issued in PCT/EP2021/050394, to which this application claims priority, dated Apr. 1, 2021, and English-language translation thereof.
"Beschreibung der Vergilbung von nahezu weißen oder nahezu farblosen Materialien [Description of yellowness of near-white or near-colourless materials]" Industrial Norm DIN 6167, Jan. 1980. Relevance is found at least in paragraph [0084] of the instant specification.
"Persönlicher Augenschutz—Optische Prüfverfahren [Personal eye-protection—Optical test methods]," Industrial Norm DIN EN 167, (Continued)

*Primary Examiner* — Larry W Thrower
(74) *Attorney, Agent, or Firm* — Tautz & Schuhmacher LLC; Georg M. Hasselmann

(57) ABSTRACT

An inkjet method for producing a spectacle lens and fluids that can be used in an inkjet method for producing a spectacle lens are disclosed. The inkjet method includes the following steps: a) providing a substrate to be printed on, b) applying to the substrate to be printed on from step a) at least two volume elements applied adjacently and/or adjoining one another, c) transferring the at least two volume elements applied adjacently and/or adjoining one another from step b) into at least one volume composite, d) transferring the at least one volume composite from step c) into at least one homogeneous volume composite, e) transferring the at least one homogeneous volume composite from step d) into at least one final volume composite.

29 Claims, No Drawings

(56) References Cited

OTHER PUBLICATIONS

Nov. 1995. Relevance is found at least in paragraphs [0019] and [0085] of the instant specification.

International Preliminary Report on Patentability issued in PCT/EP2021/050394, to which this application claims priority, completed Dec. 23, 2021, and English-language translation thereof.

Office Action by the Indian Patent Office issued in IN 202217040196, which is a counterpart hereof, dated Dec. 5, 2022 (In Hindi and English).

Office Action by the Japanese Patent Office issued in JP 2022 542292, which is a counterpart hereof, dated Dec. 13, 2022, and English-language translation thereof.

Decision of Rejection by the Japanese Patent Office (JPO) issued in JP 2022542292, which is a counterpart hereof, dated Mar. 7, 2023, and English translation thereof.

Office Action by the Japanese Patent Office issued in JP 2022-542292, which is a counterpart hereof, dated Aug. 15, 2023, and English language summary thereof.

\* cited by examiner

INKJET METHOD FOR PRODUCING A SPECTACLE LENS

CROSS REFERENCE TO RELATED APPLICATIONS

This application is a continuation application of international patent application PCT/EP2021/050394, filed Jan. 11, 2021, designating the United States and claiming priority from European patent application EP 20151152.4, filed Jan. 10, 2020, and the entire content of both applications is incorporated herein by reference.

TECHNICAL FIELD

The present disclosure relates to an inkjet method of producing a spectacle lens, and to fluids usable in an inkjet method of producing a spectacle lens.

BACKGROUND

The development of inexpensive 3D printing systems in recent years has led to a boom in the additive manufacturing (AM) sector. It is now possible to configure a multitude of materials for a wide variety of different applications from a prototype up to a functional part by 3D printing.

The potential of 3D printing of optics is apparent particularly in the case of individual optics, and optics that are manufactured in a relatively small number of items or batch size. This is especially true of spectacle lenses, the optical correction effect of which is designed individually for every wearer. Other application examples include simple imaging optics and light-conducting components, which are distinctly less demanding in terms of their design.

For plastics, direct printing methods such as fused deposition melting (FDM) and selective laser melting (SLM) have become established, which use thermoplastics in the form of filaments or powder. In addition, there exist numerous modifications of these methods, for example the Freeformer system from Arburg GmbH+Co KG. For process-related reasons, there is an elevated risk in these methods of trapped air and/or inhomogeneities and of thermal stresses, and so they are only of limited use, if any, for manufacture of optical components, especially spectacle lenses.

Greater potential for optical components is offered by reactive systems that are used in the form of a monomer formulation and are then polymerized only in a downstream process with crosslinking. As well as conventional stereolithography (SLA) and specific exposure methods such as DLP (digital light processing), the inkjet method (multijet modeling, MJM) in particular is of significance here. In the inkjet systems, what are called drop-on-demand methods (DoD methods) based on piezo technology are usually used, in which separate droplets or volume elements are produced via a piezo actuator with frequencies in the kHz range with the aid of a capillary. For the manufacture of optics components, such reactive systems, on account of the range of chemical formulation, offer much greater options with regard to material design and process configuration than the thermoplastic methods described at the outset. In order to increase process speed, multijet arrays and UV-curing systems are generally used, in which the material, after the application of a material layer, is cured by exposure.

In the inkjet method, the material for manufacture of optical components is applied in the form of small volume elements, which are each often also referred to by the term "voxel" borrowed from 3D imaging, and in some variants is spread with the aid of a coating bar to give a thin layer. Since these usually solidify or cure as a volume element, there is the risk here that an interface will form before the application of the next volume element, resulting in anisotropic properties of the optical component. For various reasons, the surface of a cured volume element and the interior of a volume element have different material properties, as a result of which an interface to a subsequent volume element is then produced, which is in turn embedded into the optical component in solid form. This risk exists particularly in the case of UV-curing systems, since they are generally cured from the surface, from the top and/or from the bottom.

For optical components, it is generally necessary to obtain a homogeneous material for the purposes of the optical properties. Thus, there should be no unwanted variations in refractive index or no unwanted interfaces within the volume of an optical component, since this can result in changes in the beam path. This can be manifested as a reduction in imaging performance, for example reduced line resolution, as anisotropic transmission of light, or as visible scatter. There should likewise also be absolute avoidance of inclusions, for example of trapped air, and other contaminations.

As a result of the customary application of the volume elements by the inkjet method, there are additionally regular and/or irregular structures in the printed material in the same order of magnitude as the size of the volume elements, i.e., of about 5 µm to 20 µm in z direction, and about 20 µm to 200 µm laterally in x/y direction. According to the application or patterning, there may additionally be regular structures or even long-range orientations. In some of the commercial methods in which the newly added material, for example newly added volume elements, is spread with the aid of a coating bar or a roller to give layers (EP1674243A2, EP1847377A2), distinct formation of layers may be observed, and optical orientations and/or preferential directions, for example varying transparency parallel to the layer structure and orthogonally thereto, may occur. Such effects may be reduced by intelligent positioning of the volume elements, but are difficult to eliminate entirely.

A further aspect that results from the application of discrete volume elements is an uneven surface with a surface topography in the order of magnitude of the z height of the volume elements and frequently regular structures. This phenomenon can be reduced, for example, by filling the resultant gaps specifically with relatively small droplets in a defined manner at the end of the printing process (EP2846983A1), or applying a complete, sufficiently thick liquid film which then results in a smooth, outwardly homogeneous surface by leveling with exploitation of surface tension. However, any structure possibly present in the volume of an optical component is not eliminated thereby.

US 2016/0167323 A1 discloses an additive manufacturing method for an ophthalmic lens. The homogeneity required for an ophthalmic lens is the to be assured during the production by the increase in viscosity of the individual voxels and subsequent interdiffusion thereof. The increase in viscosity of the individual voxels is said to have the effect here that these remain at the site intended and retain their selected geometry. After interdiffusion of the individual voxels, a homogeneous ophthalmic lens is said to be formed. The viscosity can be increased, for example, by photopolymerization or thermal polymerization of a liquid composition comprising at least one monomer and/or oligomer comprising at least one epoxy, thioepoxy, epoxysilane, (meth)acrylate, vinyl, urethane, thiourethane, isocyanate, mercapto or alcohol group, and at least one initiator. Alternatively, the viscosity can be increased after voxel formation by evaporation of a liquid composition comprising at least one monomer and/or oligomer comprising at least one epoxy, thioepoxy, (meth)acrylic acid or (meth)acrylate group, at least one initiator and a solvent.

US 2004/0008319 A1 discloses optical elements comprising a continuous film composed of mutually adjoining polymer pixels. The individual polymer pixels are said to have a particular optical property, for example a particular refractive index. With the aid of a microjet method, the individual polymer pixels are applied to a predefined site on a substrate, for example a lens blank or a finished spectacle lens. Two adjacent polymer pixels here may mix to give a single pixel. In order to avoid scattering effects, the average size of the polymer pixels should be below 200 µm.

US 2005/0046957 A1, like US 2004/0008319 A1, discloses optical elements. The polymer compositions that are applied with the aid of the microjet method as polymer pixels to a predefined site on a substrate comprise a first ene monomer and a first thiol monomer, which together have a refractive index of 1.55 or more. In addition, the polymer composition comprises a second ene monomer and a second thiol monomer, which together have a refractive index of 1.55 or less. The ratio of the polymer composition having the higher refractive index to the polymer composition having the lower refractive index may be varied within a ratio from 0:100 to 100:0.

US 2018/0354249 A1 discloses a method for the transfer of a material from a surface to another surface. The material to be transferred comprises, at least in part, a UV-curable inkjet composition comprising a thiol-acrylate composition, a thiol-ene-acrylate composition or a mixture thereof. US 2018/0354249 A1 is not concerned with the production of spectacle lenses.

EP 2 093 269 A1 discloses a compound which displays or increases its basicity under irradiation. EP 2 093 269 A1 is likewise not concerned with the production of spectacle lenses.

SUMMARY

It is an object of the present disclosure to provide a method for the production of a spectacle lens that enables the production of a spectacle lens with the associated demands on the optical quality of a spectacle lens, for example a spectacle lens having good imaging performance. More particularly, the same method is to enable the production of a spectacle lens with a uniform refractive index or a defined refractive index gradient. In addition, it is an object of the disclosure to provide a fluid suitable for the production of a spectacle lens.

This object is achieved by an inkjet method in which reactivity is transmitted between adjacently and/or mutually adjoiningly applied volume elements.

In the production of a spectacle lens, irrespective of the production method therefor, there should be absolute avoidance of formation of structures, interfaces, unintended variations in refractive index, unintended variations in material composition, trapped material and/or contaminations in the volume and/or on a surface of the spectacle lens. The wearing of a spectacle lens made of an optically non-homogeneous material is generally perceived as troublesome or unpleasant by a spectacle wearer, or can lead to incompatibilities. A spectacle lens made of an optically non-homogeneous material additionally impairs optical imaging performance. This is the case especially when the optically non-homogeneous material is at the distance visual point and/or the near visual point of a spectacle lens. According to DIN EN ISO 13666:2013-10, paragraph 5.16, the distance visual point is the assumed position of the visual point on a spectacle lens which is used for distance vision under given conditions; according to DIN EN ISO 13666: 2013-10, paragraph 5.17, the near visual point is the assumed position of the visual point on a spectacle lens which is used for near vision under given conditions.

An optically homogeneous material in the context of a spectacle lens, called "optically homogeneous material" hereinafter, is understood to mean a material which, on visual assessment, especially in transmission or in reflection, does not include any unintended variations in material composition or in refractive index, any interfaces, defects and/or structures in the volume, for example streaks, and/or any interfaces, defects and/or structures on the surface of a spectacle lens. An optically homogeneous material is also understood to mean a material which, on visual assessment, typically does not have any scatter of light and/or typically any imaging faults. In the scatter of light, a distinction is made between small-angle scatter and large-angle scatter. The proportion of light scattered mainly in the forward direction on account of scatter by small particles, by variations in the material composition or refractive index, by interfaces, by defects and/or by structures at one of the surfaces or in the volume of the spectacle lens is referred to as small-angle scatter. In the case of small-angle scatter (image sharpness), the light is scattered within a narrow cone with high concentration, and image sharpness is measured in an angle range of less than 2.5°. Small-angle scatter is typically measured according to the now withdrawn DIN EN 167:1995, paragraph 4.2, within a radius from a range from 1 mm to 3 mm around the geometric center of the spectacle lens. Small-angle scatter of typically ≤0.16 cd/m$^2$/lx, more typically ≤0.09 cd/m$^2$/lx and most typically ≤0.05 cd/m$^2$/lx is considered to be no scatter in the context of this disclosure. In the case of large-angle scatter, light is scattered uniformly in all directions. Large-angle scatter (haze, cloudiness) is the proportion of light in percent that deviates by an average of more than 2.5° from the incident light beam. The diffuse scatter of light by variations in the material composition or in the refractive index, by interfaces, by defects and/or by structures at one of the surfaces or in the volume of the spectacle lens is typically measured with the aid of an Ulbricht sphere. Large-angle scatter is typically measured with the haze-gard plus instrument from Byk Gardner without compensation in a radius from a range from 15 mm to 20 mm around the geometric center of the spectacle lens. Large-angle scatter of typically ≤1.01, more typically of ≤0.98 and most typically of ≤0.54 is considered to be no scatter in the context of this disclosure. An optically homogeneous material impairs optical imaging performance to a degree imperceptible by the human eye, if at all. The imaging performance of a spectacle lens can be described and determined, for example, via the modulation transfer function (MTF).

The objective assessment of the optically homogeneous material is typically analogous to the method described in WO 2005/017482 A1, more typically analogous to the method described in WO 2005/017482 A1, claim 1, for the visualizing of marks. For this purpose, an illumination light beam is typically directed onto the spectacle lens, which passes through the spectacle lens, after passing through the spectacle lens is reflected at a reflector in the form of a retroreflector, and is finally directed to a camera as observation light beam. Variations in refractive index, defects, interfaces, structures in the volume and/or on the surface of the spectacle lens generally lead to deflection of the beam path, as a result of which the reflected light no longer satisfies the retroreflection condition. Variations in the material composition or the material properties may be visualized in this way, for example as streaks or shadows, while defects, interfaces, structures in the volume and/or on the surface of the spectacle lens can occur as lighter or darker structures.

An optically homogeneous material thus does not have any structures, interfaces, unintended variations in refractive index, unintended variations in material composition, inclusions and/or contaminations in the volume of the material and/or on the surface thereof. The surfaces of a spectacle lens include the front face or object-side face, which, according to DIN EN ISO 13666:2013-10, paragraph 5.8, is the face of a spectacle lens intended to face away from the eye in the pair of spectacles, the reverse face or eye-side face, which, according to DIN EN ISO 13666:2013-10, paragraph 5.9, is the face of a spectacle lens intended to face the eye in the pair of spectacles, and the edge face or facet which lies between the front face and reverse face. The front face, the reverse face and the edge face or facet of a spectacle lens, each of which may constitute an interface to air or to a respective adjoining coating, are not interfaces in the context of this disclosure. In one exemplary embodiment, the spectacle lens may be a pair of smart glasses. In this case, the edge face or facet may at least partly, for example, also take the form of an input surface and optionally have an optical effect. This then constitutes an interface here.

An interface in the context of the disclosure is the face that forms between at least two adjacently applied and/or mutually adjoining volume elements, which, for example as a result of the production process, has variances in material composition and/or material properties compared to at least one of the adjoining volume elements. An interface is also the face that forms between at least two adjacently applied and/or mutually adjoining volume composites, which, for example as a result of the production process, has variances in material composition and/or material properties compared to at least one of the adjoining volume composites. An interface is additionally the face that forms between at least one volume element and at least one volume composite, which, for example as a result of the production process, has variances in material composition and/or material properties compared to at least one volume element and/or compared to at least one volume composite. The respective variances in material composition and/or material properties may be expressed, for example, in a different refractive index, a different dispersion or different scattering and/or absorption properties of the spectacle lens. As a result of such interfaces, there may thus be at least one unwanted optical property in the volume of a spectacle lens. The aforementioned volume composite may alternatively be a homogeneous volume composite in which an interface can form as a result of the concluded reaction within this homogeneous volume composite between this and at least one adjacently applied and/or adjoining volume element and/or volume composite and/or homogeneous volume composite. The volume composite may alternatively also be a final volume composite between which, as a result of non-transmission of the reactivity, an interface to at least one adjacently applied and/or adjoining volume element and/or volume composite and/or homogeneous volume composite may form.

A structure in the context of the disclosure is understood to mean an arrangement of coherent volume elements and/or volume composites and/or homogeneous volume composites and/or final volume composites and the interfaces formed between each of them. A structure may be a regular structure or an irregular structure, in each case at and/or on one of the surfaces and/or in the volume of a spectacle lens. A structure is additionally understood to mean a higher order unit or a higher order that results from superimposition of identical or different structures. Superimposition of identical or different regular structures can result, for example, in Moiré structures at and/or on one of the surfaces of a spectacle lens and/or in the volume of a spectacle lens. Higher structures at and/or on one of the surfaces of a spectacle lens and/or in the volume of a spectacle lens may also result, for example, from the layer-by-layer application of the volume elements. Corrugations or structures connected to the orange-peel effect are further examples of structures that can form at and/or on one of the surfaces of a spectacle lens.

For the additive manufacturing of a spectacle lens by means of an inkjet method in which the fluid to be printed is applied in the form of volume elements to a substrate to be printed upon, interfaces and/or structures resulting from volume elements should be avoided in the volume of the spectacle lens. One conceivable means of doing so is a reduction in the size of the volume elements, such that, even in the case of formation of interfaces and/or structures resulting from volume elements in the volume of the spectacle lens, these do not lead to disruptive optical properties, for example to scatter, and/or are below the resolution capacity of the human eye and hence are not even perceived by a spectacle wearer. However, there are two limitations here: the printable size of the volume elements and the resulting print rate. As a result of the mode of production of the volume elements, i.e., for example, by means of piezo actuators via a capillary, the size and hence the volume of the volume elements meet physical limits. The smallest sizes of volume elements of industrially utilizable inkjet print heads are currently about 1 pL, which corresponds to a diameter of the volume elements of 12.4 µm or an edge length of 10 µm. Given a size of the volume elements of 1 pL and a frequency of typically 10 kHz, it is possible with a single nozzle to print a material volume of $10^{-5}$ cm$^3$/s, meaning that $5 \times 10^5$ s or 833 min are required for a typical spectacle lens having a volume of about 5 cm$^3$. With the aid of a customary array having 256 nozzles, the pure printing time is reduced to 3 to 4 min, but the time for the movement of the printhead or of the substrate, the intermediate curing, for example the intermediate UV curing, also has to be taken into account as well. The inkjet printing of a spectacle lens therefore typically takes about 1 h under laboratory conditions.

The effective avoidance of optical effects resulting from interfaces and/or structures in the volume of a spectacle lens should only be expected below 1 µm in the case of refractive effects, but well below 100 nm in the case of diffractive and dispersive effects. For such a reduction in the structure sizes by a factor of 10 to 100, the size of the volume elements in the inkjet method would have to be reduced to about 1 fL or 1 aL. However, this cannot be achieved with the inkjet printheads currently commercially available; in addition, the print times would grow by the same factor of $10^3$ or $10^6$, assuming identical printhead geometry and identical number of nozzles. The physical limitation is fundamental and arises essentially from acoustic and fluid-dynamic parameters that form the basis of the formation of droplets or volume elements, especially the speed of sound and the rheology and surface tension of the fluids to be printed by the inkjet method.

The approach of a reduction in size of the volume elements in printing methods for avoidance of interfaces and/or structures in the volume of a spectacle lens is therefore unproductive for the reasons given and is additionally limited by physical circumstances.

On the other hand, an increase in the size of the volume elements would possibly have the advantages that both the application rate and the viscosity of the volume elements could be increased. However, an increase in the size of the volume elements would have the disadvantage that resolution in the printed article would be distinctly reduced, which can have a limiting effect in the production of particular spectacle lenses. An increase in the size of the volume elements has the limitation, for example, that a spectacle lens to be produced by means of inkjet methods in which each volume element at a particular position is to have a particular property cannot be produced in the desired resolution with the property calculated for this spectacle lens and/or with the property stipulated beforehand for this spectacle lens. Positioning each volume element having a particular property at a particular position is a requirement for the printing of spectacle lenses having location-dependent refractive index distribution. The smaller the size of the volume element here, the higher in turn the resolution and the steeper the gradients that can thus be realized, for example. For example, for achievement of a refractive index gradient of $\Delta n=10^{-3}$/mm, a volume element in the order of magnitude of 10 µm in diameter is required, assuming two fluids to be mixed that have a maximum difference in refractive index. The diameter of the volume element here is the diameter thereof during flight, before it hits the substrate. The location-dependent properties stipulated beforehand for a spectacle lens may include, for example, the refractive index and the composition of the fluid to be applied and/or of the material of the spectacle lens.

Since, as discussed above, an increasing reduction in the size of the volume elements meets the physical, technical and economic limits thereof and an increasing increase in the size of the volume elements is associated with a reduction in resolution which is unwanted for a spectacle lens, what is proposed in accordance with the disclosure is that the volume elements applied by means of an inkjet method to a substrate to be printed or a support material to be removed again first be transformed completely to a volume composite, further to a homogeneous volume composite and then to a final volume composite. A volume composite comprises at least two mutually adjoining and/or adjacently applied volume elements. A volume composite also comprises at least two mutually adjoining and/or adjacently applied volume composites. A volume composite further comprises at least one volume element and/or at least one adjoining and/or adjacently applied volume composite. A volume composite results from the coalescence, bonding, wetting and/or contact of mutually adjoining and/or adjacently applied volume elements. A volume composite also results from the coalescence, bonding, wetting and/or contact of at least two mutually adjoining and/or adjacently applied volume composites. A volume composite additionally results from the coalescence, bonding, wetting and/or contact of at least one volume element and at least one adjoining and/or adjacently applied volume composite. In a volume composite comprising at least two volume elements, the reaction within the at least one volume element and/or between the at least two mutually adjoining and/or adjacently applied volume elements has not commenced. In a volume composite comprising at least two volume composites, the reaction within at least one volume composite and/or between at least two mutually adjoining and/or adjacently applied volume composites has also not yet commenced. In a volume composite comprising at least one volume element and at least one volume composite, the reaction within at least one volume element and/or between the at least one volume element and the at least one volume composite and/or within the at least one volume composite has additionally not yet commenced.

A homogeneous volume composite includes at least one volume composite in which the reaction within at least one volume element and/or between at least two mutually adjoining and/or adjacently applied volume elements has not fully concluded. A homogeneous volume composite also includes a volume composite in which the reaction within at least one volume composite and/or between at least two mutually adjoining and/or adjacently applied volume composites has not fully concluded. A homogeneous volume composite additionally includes a volume composite in which the reaction within at least one volume element and between the at least one volume element and at least one adjoining and/or adjacently applied volume composite and within this at least one volume composite has in each case not fully concluded. In a homogeneous volume composite comprising at least two volume elements, in addition, the reactivity has not yet been transmitted between at least two mutually adjoining and/or adjacently applied volume elements. In a homogeneous volume composite comprising at least two volume composites, the reactivity has also not yet been transmitted within the at least one volume composite and/or between at least two mutually adjoining and/or adjacently applied volume composites. In a homogeneous volume composite comprising at least one volume element and at least one volume composite, the reactivity has additionally not yet been transmitted within at least one volume composite and between the at least one volume composite and the at least one volume element. Nor has the reactivity yet been transmitted within the at least one volume element in a homogeneous volume composite comprising at least one volume element and at least one volume composite. In a homogeneous volume composite comprising at least one volume element and at least one volume composite, the reactivity has not yet been transmitted from the at least one volume element to the at least volume composite.

A final volume composite includes at least one homogeneous volume composite in which the reaction within at least one volume element and between at least two mutually adjoining and/or adjacently applied volume elements has fully concluded. A final volume composite also includes a homogeneous volume composite in which the reaction within at least one homogeneous volume composite and between at least two mutually adjoining and/or adjacently applied homogeneous volume composites has fully concluded. A final volume composite additionally includes a homogeneous volume composite in which the reaction within at least one volume element and between at least one volume element and at least one adjoining and/or adjacently applied homogeneous volume composite and within the at least one homogeneous volume composite has in each case fully concluded. In a final volume composite formed from a homogeneous volume composite comprising at least two volume elements, the reactivity has been transmitted from at least one volume element to at least one adjoining and/or adjacently applied volume element. In a final volume composite formed from a homogeneous volume composite comprising at least two homogeneous volume composites, the reactivity has also been transmitted from at least one homogeneous volume composite to at least one adjoining and/or adjacently applied homogeneous volume composite. In a final volume composite, the reactivity has additionally been transmitted from at least one volume element to at least one adjoining and/or adjacently applied homogeneous volume composite. In a final volume composite, the reactivity has additionally been transmitted from at least one homogeneous volume composite to at least one adjoining and/or adjacently applied volume element.

If a final volume composite is formed from at least two mutually adjoining and/or adjacently applied homogeneous volume composites, the reaction within these at least two homogeneous volume composites and between these at least two homogeneous volume composites has in each case fully concluded. In addition, the reactivity has been transmitted from the at least one homogeneous volume composite to the adjoining and/or adjacently applied at least second homogeneous volume composite. If a final volume composite is formed from at least one homogeneous volume composite and at least one adjoining and/or adjacently applied volume element, the reaction within the at least one homogeneous volume composite, within the at least one volume element and between the at least one homogeneous volume composite and the adjoining and/or adjacently applied volume element has in each case fully concluded. The reactivity has been transmitted either from the at least one homogeneous volume composite to the at least one adjoining and/or adjacently applied volume element or from the at least one volume element to the at least one adjoining and/or adjacently applied homogeneous volume composite.

In the above remarks relating to "volume composite," "homogeneous volume composite" and "final volume composite," the alternatives mentioned, individually or in combination, may each lead to formation of a volume composite, a homogeneous volume composite or a final volume composite.

Adjacently applied volume elements are understood to mean volume elements that are applied alongside one another in x/y direction and one on top of another in z direction. Adjacently applied volume elements may be present directly one on top of another in z direction or offset in x/y direction. Adjacently applied volume elements are also understood to mean volume elements that are applied adjacently in any direction irrespective of any x/y direction or irrespective of any z direction. The volume elements may be applied adjacently in a regular or randomly distributed manner. The volume elements may also be applied adjacently in a regular or randomly distributed manner within a layer of adjacently applied volume elements. The volume elements may additionally be applied adjacently in such a way that they are distributed regularly or randomly, but are nevertheless adjacent between two layers of adjacently applied volume elements. Adjacently applied volume elements may, but need not, directly adjoin one another without interspace.

Mutually adjoining or adjoining volume elements are understood to mean volume elements that are applied adjacently. Adjacently applied volume elements may adjoin one another and/or coalesce here in any desired direction. Mutually adjoining volume elements are additionally understood to mean volume elements that are applied in a partly overlapping manner in x/y direction. In z direction, mutually adjoining volume elements may be applied directly one on top of another or offset in x/y direction. Volume elements applied directly one on top of another or offset in x/y direction may coalesce with at least one further volume element in any desired direction, or be connected and/or come into contact with at least one further volume element in any desired direction. Mutually adjoining volume elements, after coalescence, bonding and/or contact, have no interspace between the volume elements. Depending on the size of the volume elements and the print pattern, the contact angle of the at least one volume element on the uncured or partly cured surface is typically adjusted such that the mutually adjoining and/or adjacently applied volume elements overlap, resulting in coalescence. For this purpose, the surface tension of the at least one volume element is typically chosen to be sufficiently small, with typical values in the region of typically <30 mN/m, further typically from a range from 20 mN/m to 25 mN/m.

The above definitions of adjacently applied volume elements and of mutually adjoining or adjacent volume elements are analogously applicable to adjacently applied and mutually adjoining or adjoining volume composites and/or homogeneous volume composites and/or final volume composites. In addition, the above definitions are also applicable when a volume element and a volume composite and/or a homogeneous volume composite and/or a final volume composite or a volume composite and a homogeneous volume composite and/or a final volume composite have been applied adjacently or are mutually adjoining or adjoining.

A layer is understood to mean an arrangement of mutually adjoining and/or adjacently applied volume elements which is present plane-parallel to the printing surface. The volume elements here may completely or only partially cover the surface to be printed.

A volume element or a volume composite or a homogeneous volume composite or a final volume composite is fully cured for the purposes of the polymerization reaction that sets in or is possible if there is no further polymerization reaction even in the course of prolonged reaction time and/or in the case of continued activation. This does not necessarily mean that there must be 100% conversion here of the reactive groups involved in the polymerization reaction.

A reaction is considered to be incomplete if the reaction, for example a polymerization reaction, continues in the course of prolonged reaction time and/or in the case of continued activation and/or in the case of readoption of the reaction conditions.

In the case of a planar surface to be printed, for example a planar substrate, or in the case of a planar-applied layer of volume elements, x direction is defined orthogonally to the print direction parallel to the surface to be printed. y direction is defined here as the print direction. y direction is thus that direction in which at least one printhead or a printhead arrangement is moved. In order to increase print resolution or the printing area, it may additionally be necessary to move the printhead or printhead arrangement orthogonally to the print direction. z direction in the case of a planar surface to be printed is defined as the direction orthogonal to the x and y direction. What is meant by plane in connection with the surface to be printed is that this surface does not have any curvature in the macroscopic range.

In the case of a curved surface to be printed, for example a convex or concave substrate or at least one layer of volume elements applied to a convex or concave substrate, x direction here too is orthogonal to the print direction of the surface to be printed and parallel to the nozzle plate of the printhead. y direction here too is defined as the print direction for which the above remarks made with regard to the planar surface are likewise applicable. z direction in the case of a curved surface is defined as that direction orthogonal to the plane formed by x,y direction.

The above definitions of x, y and z direction in the case of a planar or curved surface do not rule out that the substrate to be printed is moved in the x direction and/or in y direction additionally or alternatively to movement of at least one printhead or a printhead arrangement. The movement is also not restricted purely to x or y direction, but may also consist of a superposition of the two directions, for example diagonally or by rotation. The movement may additionally also include z direction.

The transformation of the applied volume elements to a volume composite, further to a homogeneous volume composite and then to a final volume composite prevents interfaces and/or structures in the volume of a spectacle lens caused by volume elements from arising between adjacently applied and/or mutually adjoining volume elements. These interfaces and/or structures in turn can lead to unwanted optical effects. The transformation of the applied volume elements to a volume composite, further to a homogeneous volume composite and subsequently to a final volume composite is typically effected here not only laterally in x/y direction but also in z direction. y direction here describes the printing direction in the inkjet method, while x direction denotes the stepping direction in which the printhead/substrate/support material is moved laterally. z direction defines the direction orthogonal thereto in which the height is built up. The transformation of the applied volume elements to a volume composite, further to a homogeneous volume composite and then to a final volume composite can be effected, for example, at first laterally between volume elements applied adjacently in x/y direction and/or mutually adjoining volume elements to form a volume composite, typically with formation of a two-dimensional volume composite. Subsequently, the volume composite formed in x/y direction can be extended by volume elements applied in z direction and transformed further to a homogeneous volume composite and then to a final volume composite. The formation of a volume composite and/or a homogeneous volume composite can be assisted, for example, by kinetic energy and the arrangement in space and time of the volume elements that each arrive in z direction. The extension of a volume composite V formed in x/y direction or of a homogeneous volume composite $V_h$ formed in x/y direction here may comprise the following variants:

a) integration of volume elements applied in z direction into a volume composite V present in x/y direction or into a homogeneous volume composite $V_h$ present in x/y direction or
b) lateral transformation in x/y direction of volume elements applied in z direction to a volume composite V already present in x/y direction or to a homogeneous volume composite $V_h$ already present in x/y direction to a further volume composite V1 or to a further homogeneous volume composite $V_h1$ and subsequent integration thereof into a volume composite V already present in x/y direction or into a homogeneous volume composite $V_h$ already present in x/y direction or
c) integration of volume elements applied in z direction into a volume composite V present in x/y direction or into a volume composite $V_h$ present in x/y direction and simultaneous transformation of volume elements applied in z direction to a volume composite V1 or to a homogeneous volume composite $V_h1$.

The respectively obtained volume composite V is transformed to a homogeneous volume composite $V_h$ and then to a final volume composite. The respectively obtained homogeneous volume composite $V_h$ is then transformed to a final volume composite. Typically, a volume composite V formed in x/y direction or a homogeneous volume composite $V_h$ formed in x/y direction is extended by the integration of volume elements applied in z direction into the volume composite V that already exists in x/y direction or into the homogeneous volume composite $V_h$ that already exists in x/y direction.

In aforementioned cases a) to c), simultaneous presence of a volume composite V and a homogeneous volume composite $V_h$ is also possible.

Alternatively, the transformation of the volume elements applied to a volume composite, further to a homogeneous volume composite and subsequently to a final volume composite can at first be effected in z direction between adjacently applied and/or mutually adjoining volume elements. This formation of a volume composite and/or a homogeneous volume composite can also be assisted, for example, by kinetic energy and the arrangement in space and time of the volume elements that each arrive in z direction. Subsequently, the volume composite formed in z direction can be extended by volume elements applied in x/y direction and transformed further to a homogeneous volume composite and then to a final volume composite. The extension of a volume composite V formed in z direction or of a homogeneous volume composite $V_h$ formed in z direction here may comprise the following variants:

a) integration of volume elements applied in x,y direction into a volume composite V present in z direction or into a homogeneous volume composite $V_h$ present in z direction or
b) transformation in z direction of volume elements applied in x,y direction to a volume composite V already present in z direction or to a homogeneous volume composite $V_h$ already present in z direction to a further volume composite V1 or to a further homogeneous volume composite $V_h1$ and subsequent integration thereof into a volume composite V already present in z direction or into a homogeneous volume composite $V_h$ already present in z direction or
c) integration of volume elements applied in x,y direction into a volume composite V present in z direction or into a volume composite $V_h$ present in z direction and simultaneous conversion of volume elements applied in x,y direction to a volume composite V1 or to a homogeneous volume composite $V_h1$.

In the case of this exemplary embodiment too, the respectively obtained volume composite V is transformed to a homogeneous volume composite $V_h$ and then to a final volume composite.

The respectively obtained homogeneous volume composite $V_h$ is transformed to a final volume composite.

Typically, in this exemplary embodiment, a volume composite V formed in z direction or a homogeneous volume composite $V_h$ formed in z direction is extended by the integration of volume elements applied in x,y direction into the volume composite V that already exists in z direction or into the homogeneous volume composite $V_h$ that already exists in z direction.

In aforementioned alternative cases a) to c) too, simultaneous presence of a volume composite V and a homogeneous volume composite $V_h$ is possible.

Further alternatively, the transformation of the mutually adjoining and/or adjacently applied volume elements to a volume composite and subsequently to a homogeneous volume composite can be effected simultaneously in x/y direction and in z direction.

Further alternatively, the transformation of the mutually adjoining and/or adjacently applied volume elements to a volume composite and subsequently to a homogeneous volume composite can be effected in any desired direction. What is meant here by "in any desired direction" is that the transformation of the volume elements applied to a volume composite and subsequently to a homogeneous volume composite is effected independently of any x/y direction and independently of any z direction. The arbitrary directions are typically distributed uniformly and do not have any preferential direction. Further typically, the transformation of the volume elements applied to a volume composite and subsequently to a homogeneous volume composite is effected simultaneously in any desired direction. Proceeding from an individual volume element, this can be transformed in any desired direction with an adjacently applied and/or adjoining volume element in a volume composite and then to a homogeneous volume composite. The homogeneous volume composite is then transformed in each case to a final volume composite.

Rather than the above-described transformation of volume elements to a volume composite, further to a homogeneous volume composite and subsequently to a final volume composite, it is also possible to combine at least one volume composite and at least one further volume composite to give a homogeneous volume composite and then to give a final volume composite. This combination of volume composites is typically effected here not just laterally in x/y direction but also in z direction. If, for this purpose, in a simplified manner, for example, two volume composites V2 and V3 that are arranged adjacently one alongside another in x/y direction are considered, these two volume composites V2 and V3 may first be transformed via the interface between the two volume composites V2 and V3 in z direction to a volume composite, further to a homogeneous volume composite and subsequently to a final volume composite. If these two volume composites V2 and V3 are arranged mutually adjacently one on top of another in z direction, these two volume composites V2 and V3 may first be transformed via the interface between the two volume composites V2 and V3 in x/y direction to a volume composite, further to a homogeneous volume composite and subsequently to a final volume composite. If these two volume composites V2 and V3 are arranged mutually adjacently alongside one another in x/y direction and completely or at least partially mutually adjacently one on top of another in z direction, these two volume composites V2 and V3 may be transformed via the interfaces between the two volume elements in x/y direction and in z direction to a volume composite, further to a homogeneous volume composite and subsequently to a final volume composite. Alternatively, the transformation of at least one volume composite and at least one further volume composite to a homogeneous volume composite and subsequently to a final volume composite can be effected in any desired direction irrespective of x/y direction and/or irrespective of z direction. The arbitrary directions here are typically distributed uniformly and do not have any preferential direction. The volume composite or homogeneous volume composite resulting from the two volume composites V2 and V3 may then in turn in each case be extended by at least one volume element and/or at least one volume composite and/or at least one homogeneous volume composite. This extension of this volume composite or of this homogeneous volume composite can be effected in x/y direction and/or in z direction. Alternatively, this extension of this volume composite or of this homogeneous volume composite can be effected in any desired direction. The arbitrary directions here too are typically distributed uniformly and do not have any preferential direction. This extension of this volume composite or of this homogeneous volume composite by at least one volume element and/or at least one volume composite and/or at least one homogeneous volume composite can be effected simultaneously or successively.

According to the disclosure, a homogeneous volume composite is typically formed when the reaction within at least one volume element and between adjacently applied and/or between mutually adjoining volume elements has not fully concluded. For this purpose, for example, in simplified form, just two volume elements that are mutually adjoining and/or applied adjacently to a substrate, for example, are considered, which can react with one another, for example, by means of a polymerization reaction, including at their interface. If the polymerization reaction is fully concluded overall, as is possible for the corresponding polymerization reaction, the surface of this homogeneous volume composite formed from these two mutually adjoining and/or adjacently applied volume elements has cured. If, for example, at least one further volume element is then applied to this cured surface, what takes place, in simplified terms, is merely a distinctly reduced polymerization reaction, if any, between the cured surface and the at least one further volume element. An interface is thus formed at the cured surface with, for example, different material properties.

According to the disclosure, a homogeneous volume composite is typically also formed when the reaction within at least one volume composite and the reaction between this at least one volume composite and at least one volume element and the reaction within the at least one volume element is in each case not fully concluded. For this purpose, for example, a volume composite and a further volume element are considered, which can react with one another, for example, by means of a polymerization reaction, including at their interface. If the polymerization reaction within the volume composite has concluded as fully as possible for the corresponding polymerization reaction, a homogeneous volume composite is obtained, the surface of which has cured. At this cured surface, in simplified terms, no further polymerization reaction or only a distinctly reduced polymerization reaction takes place between the homogeneous volume composite and a further volume element, irrespective of whether or not the reaction within the further volume element has concluded as fully as possible for the corresponding polymerization reaction. Instead, at this cured surface, an unwanted interface with different material properties, for example, forms between the homogeneous volume composite and the further volume element.

According to the disclosure, a homogeneous volume composite is typically also formed when the reaction within mutually adjoining and/or adjacently applied volume composites and between mutually adjoining and/or adjacently applied volume composites, for example within a volume composite A and within a volume composite B and between the volume composite A and the volume composite B, in each case has not fully concluded. For this purpose, for example, in simplified form, a volume composite A and a volume composite B are considered, which can react with one another, for example, by means of a polymerization reaction. If the polymerization reaction within the volume composite A has concluded as fully as possible for the respective polymerization reaction, a homogeneous volume composite A is obtained, the surface of which has cured. At this cured surface, in simplified terms, no further polymerization reaction or only a distinctly reduced polymerization reaction takes place between the homogeneous volume composite A and the volume composite B, irrespective of whether or not the polymerization reaction within the volume composite B has concluded. Instead, at this cured surface, an unwanted interface with different material properties, for example, forms between the homogeneous volume composite A and volume composite B.

If there are various interfaces in each case within the volume of a volume element, of a volume composite, of a homogeneous volume composite or of a final volume composite, it is also possible for unwanted structures or regions having different material properties to form as well as these unwanted interfaces, and the volume element, volume composite, homogeneous volume composite or final volume composite is optically inhomogeneous in each case.

According to the disclosure, a final volume composite is formed when no interfaces are formed between adjacently applied and/or between mutually adjoining volume elements. According to the disclosure, a final volume composite is also formed when no interfaces are formed between an existing volume composite and at least one further volume element or between an existing homogeneous volume composite and at least one further volume element. According to the disclosure, a final volume composite is also formed when no interfaces are formed between at least one existing volume composite and at least one further volume composite or between at least one existing homogeneous volume composite and at least one further volume composite or between at least one existing homogeneous volume composite and at least one further homogeneous volume composite. When no interfaces form, there are no abrupt changes in the material properties.

According to the disclosure, a final volume composite is typically formed when the reactivity is transmitted between adjacently applied and/or between mutually adjoining volume elements. The reactivity can be transmitted between volume elements adjoining one another and/or applied adjacently in x/y direction and/or in z direction. The reactivity can alternatively be transmitted between volume elements adjoining one another and/or applied adjacently in any desired direction. Any desired direction means uniformly distributed in relation to direction and without a preferential direction. The reactivity is typically transmitted in z direction. What is meant by transmission of reactivity is that a reaction that has commenced within a volume element is continued in an adjacently applied and/or adjoining volume element. What is also meant by transmission of reactivity is that a reaction that has commenced within a volume element is continued between adjacently applied and/or between mutually adjoining volume elements. What is additionally meant by transmission of reactivity is that a reaction that has commenced within a volume element typically has not concluded fully within that one volume element before the reaction is continued i) in an adjacently applied and/or adjoining volume element and/or ii) between adjacently applied and/or mutually adjoining volume elements. The reaction commences within a volume element typically via at least one activation of the reactivity of the fluid used. The reaction may be continued in an adjacently applied and/or adjoining volume element without further activation or after reactivation. Preference is given to continuing the reaction in an adjacently applied and/or adjoining volume element after reactivation. The reactivity is typically transmitted from a volume element to an adjacently applied and/or adjoining volume element for as long as a homogeneous volume composite still comprises volume elements to which the reactivity has not yet been transmitted, or for as long as at least one further volume element is still being added. It may be the case, for this purpose, that reactivation of the reaction is necessary. In addition, a homogeneous volume composite that is no longer to be extended may be subjected to a final activation and, on completion of curing, will become a final volume composite. If, for this purpose, in simplified form, for example, a volume element 1 applied to a substrate is considered, the reaction, for example a polymerization reaction, within this volume element 1 is typically triggered by activation. If, adjacent to this one volume element 1, a further volume element 2 is then applied, the reactivity is transmitted from this one volume element 1 to the further volume element 2. The reaction that has commenced in volume element 1 is firstly continued within volume element 2; the reaction secondly also takes place between volume element 1 and volume element 2. For the continuation of the reaction within volume element 2, at least one reactivation may be required. In this way, especially by means of the reaction between volume element 1 and volume element 2, formation of an interface between two mutually adjoining and/or adjacently applied volume elements is prevented.

According to the disclosure, a final volume composite is typically also formed when the reactivity is transmitted between adjacently applied and/or between mutually adjoining homogeneous volume composites. The reactivity can be transmitted between homogeneous volume composites adjoining one another and/or applied adjacently in x/y direction and/or in z direction. The reactivity can alternatively be transmitted between homogeneous volume composites adjoining one another and/or applied adjacently in any desired direction. "In any desired direction" means uniformly distributed arbitrary directions without any preferential direction. The reactivity is typically transmitted in z direction between adjacently applied homogeneous volume composites and/or between mutually adjoining homogeneous volume composites. If, for this purpose, in simplified form, for example, a homogeneous volume composite 1 is considered, the reaction, for example a polymerization reaction, within this homogeneous volume composite 1 is typically triggered by activation. If the reactivity of this homogeneous volume composite 1 is transmitted to an adjacently applied homogeneous volume composite 2 and/or to a homogeneous volume composite 2 adjacent to this homogeneous volume composite 1, the reaction is firstly continued in this further homogeneous volume composite 2, and the reaction secondly takes place between the homogeneous volume composite 1 and the homogeneous volume composite 2. The reactivity within the homogeneous volume composite 1 and within the homogeneous volume composite 2 may in each case be activated once or more than once. The transmission of reactivity between at least two homogeneous volume composites typically also includes a transmission of the reactivity within at least one homogeneous volume composite, for example between volume elements present within a homogeneous volume composite. The transmission of reactivity between at least two homogeneous volume composites prevents formation of an interface in each case either within a homogeneous volume composites or between at least two homogeneous volume composites.

According to the disclosure, a final volume composite is typically additionally formed when the reactivity is transmitted between at least one homogeneous volume composite and a volume composite. The reactivity may be transmitted between at least one homogeneous volume composite and at least one adjacently applied and/or mutually adjoining volume composite in x/y direction and/or in z direction. The reactivity may alternatively be transmitted between at least one homogeneous volume composite and at least one adjacently applied and/or mutually adjoining volume composite in any desired direction. "In any desired direction" here means uniformly distributed arbitrary directions without any preferential direction. The reactivity is typically transmitted in z direction between at least one homogeneous volume composite and at least one adjacently applied and/or adjoining volume composite. If, for this purpose, in simplified form, for example, a homogeneous volume composite 1 is considered, the reaction, for example a polymerization reaction, within this homogeneous volume composite 1 is typically triggered by activation. If the reactivity of this homogeneous volume composite 1 is transmitted to an adjacently applied homogeneous volume composite 2 and/or to a volume composite 2 adjacent to this homogeneous volume composite 1, the reaction firstly commences in this further volume composite 2 to form a homogeneous volume composite 2', and the reaction secondly takes place between the homogeneous volume composite 1 and the homogeneous volume composite 2 now formed. The reactivity within the homogeneous volume composite 1 and within the volume composite 2 that has been transformed to a homogeneous volume composite 2' at the commencement of the reaction can in each case be activated at least once or more than once. The transmission of the reactivity between at least one homogeneous volume composite and at least one adjacently applied and/or adjoining volume composite and the transfer thereof to a homogeneous volume composite typically also comprises transmission of the reactivity within the at least one homogeneous volume composite, for example between volume elements present in a homogeneous volume composite. The transmission of reactivity between at least one homogeneous volume composite and at least one volume composite prevents formation of an interface in each case either within the at least one homogeneous volume composite or between the at least one homogeneous volume composite and the at least one volume composite or within the at least one volume composite.

According to the disclosure, a final volume composite is typically additionally formed when the reactivity is transmitted between at least one volume element and at least one homogeneous volume composite. The reactivity can be transmitted between at least one volume element and at least one adjoining homogeneous volume composite and/or one applied adjacently in x/y direction and/or in z direction. The reactivity can alternatively be transmitted between at least one volume element and at least one adjoining homogeneous volume composite and/or one applied adjacently in any desired direction. "In any desired direction" here means uniformly distributed arbitrary directions without any preferential direction. Typically, the reactivity is transmitted between at least one volume element and at least one homogeneous volume composite in z direction. The reactivity can be transmitted here from the at least one volume element to the at least one homogeneous volume composite, or in the reverse direction from the at least one homogeneous volume composite to the at least one volume element. For this purpose, in simplified form, for example, a homogeneous volume composite is considered, the reactivity of which is transmitted to an adjoining and/or adjacently applied volume element. The reaction within the homogeneous volume composite, for example a polymerization reaction, is typically triggered by at least one activation. If the reactivity of this homogeneous volume composite is transmitted to an adjoining volume element, the reaction is firstly continued within the adjacent volume element; a reaction secondly also takes place between the homogeneous volume composite and the volume element. The reactivity within the volume element may be reactivated at least once after the transmission; the reactivity within the homogeneous volume composite may be activated at least once or more than once. At least one activation within the at least one homogeneous volume composite typically also results in a transmission of the reactivity between the volume elements of a homogeneous volume composite. The transmission of reactivity from at least one homogeneous volume composite to at least one volume element or vice versa prevents formation of an interface within the at least one homogeneous volume composite or between the at least one volume composite and the at least one volume element.

According to the disclosure, a final volume composite is typically additionally formed when the reactivity is transmitted between at least one volume element and at least one volume composite. The reactivity can be transmitted between at least one volume element and at least one adjoining volume composite and/or one applied adjacently in x/y direction and/or in z direction. The reactivity can alternatively be transmitted between at least one volume element and at least one volume composite adjoining one another and/or applied adjacently in any desired direction. "In any desired direction" here means uniformly distributed arbitrary directions without any preferential direction. Typically, the reactivity is transmitted between at least one volume element and at least one volume composite in z direction. The reactivity is typically transmitted here from the at least one volume element to the at least one volume composite. For this purpose, in simplified form, for example, a volume element is considered, the reactivity of which is transmitted to an adjoining volume composite. The reaction within the volume element, for example a polymerization reaction, is typically triggered by at least one activation. If the reactivity of this volume element is transmitted to an adjoining volume composite, the reaction firstly commences within the adjoining volume composite, and a homogeneous volume composite is formed; secondly, a reaction also takes place between the volume element and the newly formed homogeneous volume composite. The reactivity within the volume element may be reactivated at least once after the transmission; the reactivity within the newly formed homogeneous volume composite may be activated at least once or more than once. The transmission of reactivity from at least one volume element to at least one volume composite and the transformation thereof to a homogeneous volume composite prevents formation of an interface in each case within the at least one volume composite or between the at least one volume composite and the at least one volume element.

According to the disclosure, a final volume composite is more typically formed when the reaction within a volume element has not fully concluded, the reaction between adjacently applied and/or between mutually adjoining volume elements has at first not fully concluded, the reactivity is transmitted between adjacently applied and/or between mutually adjoining volume elements, and the reaction is fully concluded after transmission of the reactivity. The reactivity may be transmitted between adjacently applied and/or between mutually adjoining volume elements in x/y direction, in z direction and/or in any desired direction. Any desired direction here is typically distributed uniformly and does not have any preferential direction. The reactivity is typically transmitted in z direction. For the formation of a final volume composite, in simplified form, for example, two volume elements that are mutually adjoining and applied adjacently to a substrate, for example, are considered, which can react with one another, for example, by means of a reaction, for example by means of a polymerization reaction. For formation of a final volume composite comprising these two volume elements, it is more typically a requirement for the reaction to have not fully concluded at first within each volume element and between the two volume elements in each case. In addition, it is particularly preferable that the reactivity is transmitted between these two volume elements. Typically, the reaction commences within a volume element, is transmitted to the other volume element, and is continued within the other volume element. As a result of the transmission of reactivity from one volume element to the other volume element, the reaction is additionally also continued between the two volume elements. "Between the two volume elements" typically also encompasses the reaction at that at least one interface where the two volume elements are arranged, having been applied adjacently and/or adjoining one another. The reaction can also commence in both volume elements and be transmitted between the volume elements. The reaction typically commences within a volume element after at least one activation suitable for the respective reaction. At least one activation suitable for the respective reaction may be a repetition of at least one identical activation or may be mutually different activations. The mutually different activations may, for example, be an activation by means of actinic radiation, e.g., UV radiation, and/or an activation by means of thermal energy. After transmission of the reactivity between the two volume elements, at least one reactivation may be required. After full conclusion of the reaction, for example of a polymerization reaction, within and between the at least two volume elements, a cured final volume composite is obtained. The addition, for example, of at least one further volume element to this final volume composite would then form an interface.

According to the disclosure, a final volume composite is more typically also formed when the reaction within at least one homogeneous volume composite has at first not fully concluded, the reaction between adjacently applied and/or between mutually adjoining homogeneous volume composites has at first not fully concluded, the reactivity is transmitted between adjacently applied and/or between mutually adjoining homogeneous volume composites, and the reaction is fully concluded after transmission of the reactivity. The reactivity may be transmitted between adjacently applied and/or between mutually adjoining homogeneous volume composites in x/y direction, in z direction and/or in any desired direction. Any desired direction here is typically distributed uniformly and does not have any preferential direction. The reactivity is typically transmitted in z direction. If, for formation of a final volume composite, in simplified form, for example, two homogeneous volume composites are considered, within which and between which the reaction, for example a polymerization reaction, has at first in each case not fully concluded, it is particularly preferable when the reactivity is transmitted from one homogeneous volume composite to the other homogeneous volume composite. If the reaction commences within one homogeneous volume composite, it is transmitted to the other homogeneous volume composite and continued in the other homogeneous volume composite. As a result of the transmission of reactivity from one homogeneous volume composite to the other homogeneous volume composite, the reaction is additionally also continued between the two homogeneous volume composites. "Between the two homogeneous volume composites" typically also encompasses the reaction at that at least one interface where the two homogeneous volume composites are arranged, having been applied adjacently and/or adjoining one another. The reaction can also commence in both homogeneous volume composites and be transmitted between the homogeneous volume composites. The reaction typically commences within at least one homogeneous volume composite after at least one activation suitable for the respective reaction. At least one activation suitable for the respective reaction may be a repetition of an identical activation or may be mutually different activations. The mutually different activations may, for example, be an activation by means of actinic radiation, e.g., UV radiation, and an activation by means of thermal energy. After transmission of the reactivity between the homogeneous volume composites, at least one reactivation may be required. After full conclusion of the reaction, for example of a polymerization reaction, within and between the at least two homogeneous volume composites, a cured final volume composite is obtained. The addition, for example, of at least one further volume element and/or a further homogeneous volume composite to this final volume composite would then form an interface.

According to the disclosure, a final volume composite is more typically also formed when the reaction within at least one homogeneous volume composite has at first not fully concluded, the reaction between at least one homogeneous volume composite and at least one adjacently applied and/or adjoining volume composite has at first not fully concluded, the reactivity is transmitted between the homogeneous volume composite and the adjacently applied and/or adjoining volume composite, and the reaction is fully concluded after transmission of the reactivity. The reactivity may be transmitted here in x/y direction, in z direction and/or in any desired direction. Any desired direction is typically distributed uniformly and does not have any preferential direction. The reactivity is typically transmitted in z direction. If, for formation of a final volume composite, in simplified form, for example, one homogeneous volume composite and one adjacently applied and/or adjoining volume composite are considered, within which and between which the reaction, for example a polymerization reaction, has in each case at first not fully concluded or has not yet commenced, it is particularly preferable when the reactivity is transmitted from the homogeneous volume composite to the volume composite. Typically, the reaction commences within the homogeneous volume composite and is not yet fully concluded within the homogeneous volume composite. In that case, the reaction is transmitted to the volume composite and continued in the volume composite.

As a result of the transmission of reactivity from the homogeneous volume composite to the volume composite, the reaction is additionally also continued between the homogeneous volume composite and the volume composite. "Between the homogeneous volume composite and the volume composite" typically also encompasses the reaction at that at least one interface where the homogeneous volume composite and the volume composite are arranged, having been applied adjacently and/or in an adjoining manner. The reaction typically commences within the at least one volume composite after transmission of the reactivity after at least one activation suitable for the respective reaction, and this volume composite is transformed to a homogeneous volume composite in which the reaction has not yet fully concluded. At least one activation suitable for the respective reaction may be a repetition of at least one identical activation or may be mutually different activations. The mutually different activations may, for example, be an activation by means of actinic radiation, e.g., UV radiation, and an activation by means of thermal energy. After transmission of the reactivity between the homogeneous volume composite and the volume composite, a reactivation may be required. After full conclusion of the reaction, for example of a polymerization reaction, within and between the at least one homogeneous volume composite and the at least one volume composite, a cured final volume composite is obtained. The addition, for example, of at least one further volume element and/or a further homogeneous volume composite and/or a volume composite to this final volume composite would then form an interface.

According to the disclosure, a final volume composite is more typically additionally formed when the reaction within a volume element has at first not fully concluded, the reaction between this one volume element and an adjacently applied volume composite and/or a volume composite adjoining this one volume element has at first not fully concluded, the reactivity is transmitted from this one volume element to the adjacently applied and/or to the adjoining volume composite, and the reaction is fully concluded after transmission of the reactivity. The reactivity may be transmitted from the at least one volume element to the at least one volume composite in x/y direction, in z direction and/or in any desired direction. Any desired direction is typically distributed uniformly and does not have any preferential direction. If, for formation of a final volume composite, in simplified form, for example, a volume element within which a reaction, for example a polymerization reaction, has not fully concluded and a volume composite within which a reaction, for example a polymerization reaction, has not yet commenced are considered, it is particularly preferable when the reactivity is transmitted from the volume element to the volume composite. Typically, the reaction commences within the volume element, is transmitted to the volume composite, and continued within the volume composite with transformation thereof to a homogeneous volume composite. The transmission of the reactivity additionally typically also encompasses continuation of the reaction at that interface which is common between the volume element and the volume composite or the homogeneous volume composite which is then formed. The reaction typically commences within the volume element after an activation suitable for the respective reaction. At least one activation suitable for the respective reaction may be a repetition of an identical activation or may be mutually different activations. The mutually different activations may, for example, be an activation by means of actinic radiation, e.g., UV radiation, and an activation by means of thermal energy. After transmission of the reactivity from the volume element to the volume composite, a reactivation may be required. After full conclusion of the reaction, for example of a polymerization reaction, within and between the at least one volume element and the at least one volume composite, a cured final volume composite is obtained. The addition, for example, of at least one further volume element and/or a further homogeneous volume composite and/or a volume composite to this final volume composite would then form an interface.

According to the disclosure, a final volume composite is more typically additionally formed when the reaction within at least one homogeneous volume composite has at first not fully concluded, the reaction between this at least one homogeneous volume composite and at least one adjacently applied and/or adjoining at least one volume element has at first not fully concluded, and the reactivity is transmitted from this one homogeneous volume composite to the at least one adjacently applied and/or adjoining volume element, and the reaction is fully concluded after transmission of the reactivity. The reactivity may be transmitted from the at least one homogeneous volume composite to the at least one volume element in x/y direction, in z direction and/or in any desired direction. Any desired direction is typically distributed uniformly and does not have any preferential direction.

The reactivity is typically transmitted in z direction. If, for formation of a final volume composite, in simplified form, for example, one homogeneous volume composite and one volume element, within and between which a reaction, for example a polymerization reaction, has in each case at first not fully concluded are considered, it is very particularly preferable when the reactivity is transmitted from the homogeneous volume composite to the volume element. Typically, the reaction within a volume composite commences with transformation thereof to a homogeneous volume composite, is transferred from the latter to the volume element and continued within the volume element. The transmission of the reactivity additionally typically also encompasses continuation of the reaction at that interface which is common between the homogeneous volume composite and the volume element. The reaction typically commences within the volume composite after an activation suitable for the respective reaction with transformation thereof to a homogeneous volume composite. At least one activation suitable for the respective reaction may be a repetition of an identical activation or may be mutually different activations. The mutually different activations may, for example, be an activation by means of actinic radiation, e.g., UV radiation, and an activation by means of thermal energy. After transmission of the reactivity from the homogeneous volume composite to the volume element, a reactivation may be required. After full conclusion of the reaction, for example of a polymerization reaction, within and between the at least one homogeneous volume composite and the at least one volume element, a cured final volume composite is obtained. The addition, for example, of at least one further volume element and/or a further homogeneous volume composite and/or a volume composite to this final volume composite would then form an interface with the latter.

According to the disclosure, a final volume composite is more typically additionally formed when the reaction within at least one homogeneous volume composite and within at least one volume element has in each case at first not fully concluded, the reaction between this at least one homogeneous volume composite and at least one adjacently applied and/or adjoining at least one volume element has at first not fully concluded, and the reactivity is transmitted between this at least one homogeneous volume composite and the at least one adjacently applied and/or adjoining volume element, and the reaction is fully concluded after transmission of the reactivity. The reactivity may be transmitted between the at least one homogeneous volume composite and the at least one volume element in x/y direction, in z direction and/or in any desired direction. Any desired direction is typically distributed uniformly and does not have any preferential direction. The reactivity is typically transmitted in z direction. If, for formation of a final volume composite, in simplified form, for example, one homogeneous volume composite and one volume element, within and between which a reaction, for example a polymerization reaction, has in each case at first not fully concluded are considered, it is particularly preferable when the reactivity is transmitted between the homogeneous volume composite and the volume element.

Typically, the reaction commences within the volume composite with transformation thereof to a homogeneous volume composite, and within the volume element, and is transmitted and continued from the homogeneous volume composite to the volume element and from the volume element to the homogeneous volume composite. The transmission of the reactivity additionally typically also encompasses continuation of the reaction at that interface which is common between the homogeneous volume composite and the volume element. Typically, the reaction within the volume composite commences after an activation suitable for the respective reaction with transformation thereof to a homogeneous volume composite, and within the volume element likewise after an activation suitable for the respective reaction. At least one activation suitable for the respective reaction may be a repetition of an identical activation or may be mutually different activations. The mutually different activations may, for example, be an activation by means of actinic radiation, e.g., UV radiation, electron beam radiation or visible light, and an activation by means of thermal energy. After transmission of the reactivity between the homogeneous volume composite and the volume element, a reactivation may be required. After full conclusion of the reaction, for example of a polymerization reaction, within and between the at least one homogeneous volume composite and the at least one volume element, a cured final volume composite is obtained. The addition, for example, of at least one further volume element and/or a further homogeneous volume composite and/or a volume composite to this final volume composite would then form an interface with the latter.

Common to all the aforementioned variants for formation of a final volume composite is that, in a final volume composite, a reaction is typically no longer continued, but fully concluded, and the reactivity is typically no longer transmitted.

The reaction that takes place within at least one volume element, within at least one volume composite with transformation thereof to a homogeneous volume composite and/or within at least one homogeneous volume composite with transformation thereof to a final volume composite can be activated by means of actinic radiation, e.g., UV radiation, and/or by means of thermal energy. The reaction is typically activated by means of UV radiation. The activation of the reaction by means of actinic radiation, typically UV radiation, can be effected at least once and optionally repeated. Optionally, the activation of the reaction can be effected at least twice by means of different radiation (e.g., different wavelength, intensity or dose).

The reaction that takes place i) between at least two volume elements, ii) between at least two homogeneous volume composites, iii) between at least one volume element and at least one volume composite and/or at least one homogeneous volume composite and/or iv) between at least one homogeneous volume composite and at least one volume composite can be activated by means of actinic radiation, e.g., UV radiation, or by means of thermal energy. In this case too, the reaction is typically activated by means of UV radiation. In this case too, the activation of the reaction by means of actinic radiation, typically UV radiation, can be effected at least once and optionally repeated. Optionally, the activation of the reaction, in this case too, can be effected at least twice by means of different UV radiation.

The activation of the reaction within and between the volume elements, volume composites and homogeneous volume composites, as described above, can independently be effected successively or simultaneously. The activation of the reaction is typically effected simultaneously, and hence prevents formation of interfaces within and between volume elements, volume composites and homogeneous volume composites.

The transformation of the volume elements applied to a volume composite, further to a homogeneous volume composite and subsequently to a final volume composite is of increasing importance with decreasing size of the volume elements applied. The smaller the volume elements, more significant the rise in the proportion by volume of the interfaces and near-interface regions. Even though the size of the volume elements is negligible according to the disclosure, it is preferable to apply small volume elements to the substrate to be printed by means of an inkjet method. Small volume elements are understood to mean volume elements having a volume of typically 1 pL to 50 pL, more typically having a volume of 2 pL to 30 pL. One advantage of small volume elements is that better resolution is utilizable thereby, which enables, for example, a calculated location-dependent refractive index distribution and/or steeper gradients.

According to the disclosure, the transformation of the volume elements applied from a volume composite to a homogeneous volume composite and subsequently to a final volume composite is achieved by controlled activation of the reactivity of the fluid to be used in accordance with the disclosure. Controlled activation of the reactivity of the fluid to be used in accordance with the disclosure in turn enables better control of the reaction. More particularly, the juncture from which the reaction, typically a polymerization, of the fluid to be used in accordance with the disclosure commences after application thereof can be triggered and controlled in a specific manner. Prior to the application of the fluid to be used in accordance with the disclosure, the reaction, typically a polymerization, proceeds only very weakly, if at all, without specific activation. The fluid to be used in accordance with the disclosure thus has a sufficiently long processing time to be usable in an inkjet method. If the fluid to be used in accordance with the disclosure is used in an inkjet method, it does not cure in an unwanted manner prior to the application; in other words, reservoir vessels, conduits, or nozzles of an inkjet printer, an inkjet printhead or a printhead arrangement do not contain any fluid, typically any polymerized fluid, that has either become unusable for application and/or leads to blockage of the conduits and/or the nozzles. The fluid to be used in accordance with the disclosure thus typically has a high stability and sufficiently long processing time in order to be able to be applied by means of a printhead, typically a piezo printhead, to a substrate and/or a layer of volume elements. Typically, the processing time of the fluid to be used in accordance with the disclosure is at least 1 h, typically at least 5 h and more typically at least 10 h. Prolonged stability has been attained when the fluid to be used in accordance with the disclosure does not show any significant change over a period of at least 4 weeks at the target processing temperature in the inkjet method.

None of US 2016/0167323 A1, US 2004/0008319 A1, and US 2005/0046957 A1 discloses the transformation of adjacently applied and/or mutually adjoining volume elements to a volume composite, further to a homogeneous volume composite and subsequently to a final volume composite, which prevents the formation of unwanted interfaces in the final volume composite through reaction between originally present interfaces and the transmission of reactivity. US 2016/0167323 A1, US 2004/0008319 A1, and US 2005/0046957 A1 additionally do not disclose any of the fluids to be used in accordance with the disclosure.

The fluid to be used in accordance with the disclosure enables the production of spectacle lenses which, if they are spectacle lenses having a uniform refractive index, have a refractive index from a range of typically $n_D$=1.49 to 1.76, further typically of $n_D$=1.50 to 1.67, where the refractive index is reported for the wavelength of the sodium D line. If the spectacle lenses are those having a calculated location-dependent refractive index distribution, it is possible to implement reflective indices from the aforementioned range. The refractive index is typically determined on the basis of the cured fluid with the aid of an Abbe refractometer with the aid of a suitable light source and suitable immersion liquids at a temperature of 21° C.

The fluid to be used in accordance with the disclosure additionally enables the production of spectacle lenses having an Abbe number $v_d$ for a refractive index from a range of $n_D$=1.49 to 1.60 which is typically in a range from 40 to 60, and for a refractive index from a range from $n_D$>1.60 to 1.76 which is typically in a range from 30 to 45. The Abbe number or dispersion of the fluid is typically determined on the basis of the cured fluid with the aid of an Abbe refractometer with the aid of monochromatic light sources and suitable immersion liquids at a temperature of 21° C.

The fluid to be used in accordance with the disclosure additionally enables the production of spectacle lenses, the density of which is typically within a range from 0.90 g/cm³ to 1.50 g/cm³. The density of the polymer is typically determined via the displacement principle or via gas pycnometry.

The fluid to be used in accordance with the disclosure additionally enables the production of spectacle lenses having a softening point typically of $T_g$>60° C., further typically of $T_g$>80° C., further typically of $T_g$>100° C. The softening point $T_g$ is typically determined on the cured material by means of dynamic mechanical analysis (DMA).

The fluid to be used additionally enables the production of spectacle lenses which, after coating of at least the front face and/or the reverse face, typically have high impact resistance, more typically meet the requirements of the ball drop test according to 21 CFR 801.410, in which the spectacle lens must not be fully destroyed after impact of a steel ball of size 15.87 mm and weight 16.36 g from a height of 1.27 m.

The fluid to be used in accordance with the disclosure additionally enables the production of spectacle lenses that typically have maximum neutrality of color and typically have a low yellow value of G<2.0. These spectacle lenses typically also do not show any aging- and/or process-related yellowing over a period of two years. The yellowness value is determined according to DIN 6167 and is calculated from the standard color values X, Y, Z according to $$G = \frac{a \cdot X - b \cdot Y}{Y} \cdot 100,$$

with a=1.301 and b=1.149 (D65 standard illuminant, 10° normal observer).

The fluid to be used in accordance with the disclosure additionally enables the production of spectacle lenses having a small-angle scatter of typically ≤0.16 cd/m²/lx, more typically ≤0.09 cd/m²/lx and most typically ≤0.05 cd/m²/lx. Small-angle scatter is typically measured according to the now withdrawn DIN EN 167:1995, paragraph 4.2, within a radius from a range from 1 mm to 3 mm around the geometric center of the spectacle lens.

The fluid of the disclosure also enables the production of spectacle lenses having a large-angle scatter of typically ≤1.01, more typically ≤0.98 and most typically ≤0.54. Large-angle scatter is typically measured with the haze-gard plus instrument from Byk Gardner without compensation in a radius from a range from 15 mm to 20 mm around the geometric center of the spectacle lens.

Optically homogeneous spectacle lenses are understood to mean spectacle lenses that, for example, do not have any unwanted variations or abrupt changes in refractive index, in material properties or in density, any interfaces or other structures in the volume of the spectacle lens, and any inclusions of, for example, air or other impurities. Optically homogeneous spectacle lenses are also understood to mean spectacle lenses in which there is no reduction in imaging performance. The imaging performance of a spectacle lens can be determined, for example, via measurement of the modulation transfer function (MTF).

The fluid to be used in accordance with the disclosure thus enables the production of spectacle lenses that correspond to conventionally manufactured spectacle lenses in terms of refractive index, Abbe number, density, softening point, impact resistance, color neutrality and/or optical homogeneity. The fluid to be used additionally enables the production of spectacle lenses that surpass conventionally manufactured spectacle lenses in terms of refractive index distribution and/or imaging performance. By contrast with the conventional methods of producing finished spectacle lenses, however, material input in the method of the disclosure is distinctly lower since the latter can give the finished spectacle lens with a finished front face, i.e., with a finished object-side face, which, according to DIN EN ISO 13666:2013-10, paragraph 5.8, is that intended to face away from the eye in the pair of spectacles, and a finished reverse face, i.e., finished eye-side face, which, according to DIN EN ISO 13666:2013-10, paragraph 5.9, is that intended to face the eye in the pair of spectacles, and possibly even with the desired shape, without any need for removal of material from surfaces and/or form edging of rough-edged finished spectacle lenses. The fluid to be used additionally enables the production of spectacle lenses having calculated location-dependent refractive index distribution. What is meant here by calculated location-dependent refractive index distribution is that, in the production of the spectacle lens, every volume element is applied at the position predetermined for that volume element on the surface to be printed. The surface to be printed here may be a substrate, a further volume element, a volume composite and/or a homogeneous volume composite. The predetermined position at which a volume element is to be applied is ascertained here from the calculation of the surface topography of the front face and/or the reverse face, from the classification by spectacle lens form according to DIN EN ISO 13666:2013-10, paragraph 8.2, from the classification according to degree of completion according to DIN EN ISO 13666:2013-10, paragraph 8.4, and/or from the classification according to spectacle lens type according to DIN EN ISO 13666:2013-10, paragraph 8.3, of the spectacle lens to be produced in each case. The location-dependent refractive index distribution is typically calculated and optimized beforehand by means of optical calculation programs, for example ZEMAX (from Zemax LLC). For the calculation, the position of the spectacle lens in front of the eye intended, the interpupillary distance, the pantoscopic tilt of the spectacle lens, the face form angle of the spectacle lens and the size of the spectacle lens must typically be known. Furthermore, particularly the calculation of multifocal spectacle lenses, bifocal spectacle lenses, trifocal spectacle lenses, varifocal spectacle lenses and degressive spectacle lenses is based on an object distance model which describes the position of object points in the spectacle wearer's field of view relative to the centers of rotation of the wearer's eyes.

The fluid to be used enables the production of semifinished spectacle lens blanks, i.e., of lens blanks having just one optically ready-processed face according to DIN EN ISO 13666:2013-10, paragraph 8.4.2, or of finished spectacle lenses, i.e., of spectacle lenses having two ready-processed optical faces before or after edge processing according to DIN EN ISO 13666:2013-10, paragraph 8.4.6. The semifinished spectacle lens blanks may be produced in the form of single-vision semifinished spectacle lens blanks, multifocal semifinished spectacle lens blanks or progressive-power semifinished spectacle lens blanks according to DIN EN ISO 13666:2013-10, paragraphs 8.4.3, 8.4.4 and 8.4.5. The finished spectacle lenses may be produced in the form of single-vision spectacle lenses, multifocal spectacle lenses, bifocal spectacle lenses, trifocal spectacle lenses, progressive-power spectacle lenses or degressive-power spectacle lenses pursuant to DIN EN ISO 13666:2013-10, paragraphs 8.3.1, 8.3.2, 8.3.3, 8.3.4, 8.3.5 and 8.3.6. Typically, the fluid to be used in accordance with the disclosure is used for production of finished spectacle lenses. The finished spectacle lenses may be produced either in already form-edged form, or the rough-edged finished spectacle lenses may finally be form-edged according to DIN EN ISO 13666:2013-10, paragraph 8.4.15.

The fluid to be used in accordance with the disclosure has a viscosity typically from a range from 5 mPas to 20 mPas, further typically from a range from 7 mPas to 15 mPas and more typically from a range from 8 mPas to 11 mPas, in each case at the respective printing temperature. The viscosity of the fluid to be used in accordance with the disclosure is typically measured with the C-VOR 150 rheometer, from Malvern Instruments Ltd., in plate-cone arrangement (1° cone) at a shear rate of $1,000$ $s^{-1}$ at the respective printing temperature of the fluid. Within the above-stated viscosity range, at the respective printing temperature, typically at a printing temperature between 30° C. and 80° C., more typically at a printing temperature between 40° C. and 50° C., stable formation of volume elements is assured.

The fluid to be used in accordance with the disclosure has a static surface tension typically from a range from 20 mN/m to 40 mN/m and more typically from a range from 25 mN/m to 35 mN/m, in each case at the corresponding printing temperature.

Surface tension is typically determined at a temperature of 25° C. or the corresponding printing temperature with the aid of an instrument for drop shape analysis (pendant drop method), for example with the OCA 20 instrument from DataPhysics Instruments GmbH.

Within the above-stated range of surface tension, at the respective printing temperature, typically a printing temperature between 40° C. and 50° C., stable formation of volume elements is assured.

The fluid of the disclosure is typically printed with a printhead or printhead arrangement having a resolution of typically at least 300×300 dpi, further typically at least 600×600 dpi and more typically at least 1,200×1,200 dpi.

A volume element which, according to the above remarks, by virtue of coalescence, bonding, wetting and/or contact with at least one further volume element, at first forms a volume composite, which is then in turn transformed to a homogeneous volume composite and finally to a final volume composite, may comprise at least one of the fluids specified hereinafter. A volume element that serves to extend a volume composite or a homogeneous volume composite may likewise comprise at least one of the fluids below.

The monomers mentioned in the fluids below are used as reactive components, and in that case are subject to the respective polymerization reaction that sets in.

DESCRIPTION OF EXEMPLARY EMBODIMENTS

I Fluid to be Used in Accordance with the Disclosure Based on Hybrid Systems

A hybrid system in the context of the present disclosure is understood to mean a composition in which at least two chemical subsystems with different curing reactions are used. These subsystems may either react as independent systems independently with polymerization or else may react partly with one another, in that, for example, individual components may occur as co-reactants in both curing reactions. The curing reactions involved may proceed identically or very similarly or differ, for example, in the curing mechanism, curing rate or degree of crosslinking.

I.1 Fluid to be Used in Accordance with the Disclosure Based on Thiol-Ene-(Meth)Acrylate Hybrid Systems Thiol-ene-(meth)acrylate hybrid systems are a combination of at least one thiol-ene system and at least one (meth)acrylate system. The at least one (meth)acrylate system is typically UV- or radiation-curable. The at least one thiol-ene system comprises at least one thiol monomer and at least one ene monomer. The at least one thiol monomer and the at least one ene monomer are present here typically in a stoichiometric ratio or with a slight excess of ene monomer, typically in a stoichiometric ratio of at least one thiol monomer to at least one ene monomer from a range from 1:1.001 to 1:1.10, further typically from a range from 1:1.01 to 1:1.05. A slight excess of ene monomer avoids any residual content of thiol groups in the cured fluid. The at least one thiol monomer used is typically an at least difunctional thiol monomer. The at least one thiol monomer used is typically at least one difunctional mercapto ester and/or at least one difunctional mercapto thioether. The ene monomer used is typically a monofunctional ene monomer or an at least difunctional ene monomer. The at least one ene monomer used is typically at least one monofunctional or difunctional vinyl compound, more typically at least one monofunctional or difunctional vinyl ether and/or at least one monofunctional or difunctional allyl compound.

The at least one (meth)acrylate system comprises at least one (meth)acrylate monomer and/or at least one thio(meth)acrylate monomer. The at least one (meth)acrylate monomer present in the at least one (meth)acrylate system may be at least one monofunctional (meth)acrylate monomer, at least one difunctional (meth)acrylate monomer, at least one trifunctional (meth)acrylate monomer, at least one tetrafunctional (meth)acrylate monomer, at least one pentafunctional (meth)acrylate monomer and/or at least one hexafunctional (meth)acrylate monomer. Typically, the at least one (meth)acrylate system comprises at least one difunctional (meth)acrylate monomer, at least one trifunctional (meth)acrylate monomer, at least one tetrafunctional (meth)acrylate monomer, at least one pentafunctional (meth)acrylate monomer and/or at least one hexafunctional (meth)acrylate monomer. If the at least one (meth)acrylate monomer comprises at least two functional groups, this facilitates the formation of a crosslinked polymer network. The at least one thio(meth)acrylate monomer present in the at least one (meth)acrylate system may be at least one monofunctional thio(meth)acrylate monomer, at least one difunctional thio(meth)acrylate monomer, at least one trifunctional thio(meth)acrylate monomer, at least one tetrafunctional thio(meth)acrylate monomer, at least one pentafunctional thio(meth)acrylate monomer and/or at least one hexafunctional thio(meth) acrylate monomer. Typically, the at least one (meth)acrylate system comprises at least one difunctional thio(meth)acrylate monomer, at least one trifunctional thio(meth)acrylate monomer, at least one tetrafunctional thio(meth)acrylate monomer, at least one pentafunctional thio(meth)acrylate monomer and/or at least one hexafunctional thio(meth) acrylate monomer. If the at least one thio(meth)acrylate monomer comprises at least two functional groups, this also facilitates the formation of a densely crosslinked polymer network.

If the thiol-ene-(meth)acrylate hybrid system comprises at least two different thiol monomers, these may be present in any desired weight ratio to one another. If the thiol-ene-(meth)acrylate hybrid system comprises at least two different ene monomers, these may be present in any desired weight ratio to one another. If the thiol-ene-(meth)acrylate hybrid system comprises at least two different (meth)acrylate monomers, these may be present in any desired weight ratio to one another.

Thiol monomers used in the thiol-ene-(meth)acrylate hybrid system may, for example, be glycol di (3-mercaptopropionate), trimethylolpropane tri (3-mercaptopropionate), pentaerythritol tetra(3-mercaptopropionate), glycol dimercaptoacetate, trimethylolpropane trimercaptoacetate, pentaerythritol tetramercaptoacetate, dimercaptodiethyl sulfide, bis(2-mercaptoethyl) ether, 4-mercaptomethyl-3,6-dithiaoctane-1,8-dithiol or mixtures thereof.

Ene monomers used in the thiol-ene-(meth)acrylate hybrid system may, for example, be vinyl compounds such as butane-1,4-diol divinyl ether, diethylene glycol divinyl ether, triethylene glycol divinyl ether, cyclohexane-1,4-dimethanol divinyl ether, 1,2,4-trivinylcyclohexane, divinylbenzene or mixtures thereof.

Ene monomers used in the thiol-ene-(meth)acrylate hybrid system may, for example, be allyl compounds such as triallyl-s-triazinetrione, diallyl ether, allyl methacrylate, diallyl sulfide, diallyl disulfide, triallylamine, diallyltrifluoroacetamide or mixtures thereof.

(Meth)acrylate monomers used in the thiol-ene-(meth) acrylate hybrid system may, for example, be methyl (meth) acrylate, ethyl (meth)acrylate, isobutyl (meth)acrylate, tetrahydrofurfuryl (meth)acrylate, isobornyl (meth)acrylate, butane-1,3-diol di(meth)acrylate, butane-1,4-diol di(meth) acrylate, hexane-1,6-diol di(meth)acrylate, nonane-1,9-diol di(meth)acrylate, 3-methylpentane-1,5-diol di(meth)acrylate, ethylene glycol di(meth)acrylate, diethylene glycol di(meth)acrylate, neopentyl glycol di(meth)acrylate, dipropylene glycol di(meth)acrylate, tripropylene glycol di(meth) acrylate, polyethylene glycol-[9EO] di(meth)acrylate, polyethylene glycol-200 di(meth)acrylate, polyethylene glycol-400 di(meth)acrylate, tricyclodecanedimethanol di(meth) acrylate, trimethylolpropane tri(meth)acrylate, trimethylolpropane-[3EO] triacrylate, trimethylolpropane-[3PO] tri(meth)acrylate, pentaerythritol-[5EO] tetra(meth) acrylate, tris-[2-((meth)acryloyloxy)ethyl] isocyanurate, bis (ethylthio(meth)acrylate) sulfide, 2-(perfluorobutyl)ethyl (meth)acrylate or mixtures thereof. Thio(meth)acrylates used in the thiol-ene-(meth)acrylate hybrid system may, for example, be (meth)acryloylthioethane, glycidyl thio(meth) acrylate, 1,2-bis[(meth)acryloylthio]ethane, 1,3-bis[(meth) acryloylthio]propane, 1,2-bis[2-(meth)acryloyl-thioethylthio]-3-[(meth)acryloylthio]propane, 1,4-bis[(meth) acryloylthio]butane, bis[(2-(meth)acryloylthioethyl] ether, 1,4-bis(acryloylthiomethyl)benzene, 1,4-bis[(meth)acryloyl-thiomethyl]benzene, 1,4-bis[2-(meth)acryloylthioethylthiomethyl]benzene, bis[(2-(meth)acryloylthioethyl)] sulfide, bis(4-acryloylthiophenyl) sulfide, bis(4-methacryloyl-thiophenyl) sulfide or mixtures thereof.

The thiol-ene-(meth)acrylate hybrid system comprises the at least one thiol-ene system in a proportion from a range from typically 10% by weight to 70% by weight, further typically 11% by weight to 60% by weight, further typically 12% by weight to 53% by weight, especially typically 13% by weight to 46% by weight and most typically 14% by weight to 33% by weight, based in each case on the total weight of the thiol-ene-(meth)acrylate hybrid system. If the proportion of the thiol-ene system is <10% by weight or >70% by weight, based in each case on the total weight of the thiol-ene-(meth)acrylate hybrid system, there will be insufficient reaction of the thiol-ene system with the (meth) acrylate system, and no formation of a sufficiently stable thiol-ene-(meth)acrylate hybrid system.

The curing of the thiol-ene-(meth)acrylate hybrid system is typically effected by UV-induced polyaddition. The thiol-ene-(meth)acrylate hybrid system, by contrast with commercially available print fluids based on UV-curing (meth) acrylate monomers, can be polymerized under air without unwanted inhibition effects by (atmospheric) oxygen at the interface of a volume element and/or of a volume composite and/or of a homogeneous volume composite with air in each case. This is extremely advantageous since there is no need to provide an inert gas atmosphere. By contrast, the use of UV-curing (meth)acrylate monomers in print fluids under inert conditions has the disadvantage that the reaction thereof proceeds very quickly. During the printing process, a print fluid comprising UV-curing (meth)acrylate monomers may show unwanted incomplete curing at the interface with air as a result of oxygen inhibition of the free-radical reaction, as a result of which a subsequently applied volume element is incapable of binding fully and, in the worst case, includes an incompletely cured layer in the volume of an object to be produced. It is possible to avoid oxygen inhibition of the free-radical reaction by laborious purging with inert gas, but this distinctly increases the reaction rate and hence makes it difficult to control the process. An increase in the reaction rate may in turn lead to faster curing of the individually applied volume elements, which in turn promotes the formation of interfaces in the volume of an object. In each case, the UV curing results in an altered surface layer and also in unwanted gradients and/or inhomogeneities in the volume of an object, since the curing reaction proceeds from the surface, from the top and/or from the bottom. Both the crosslinking density and the refractive index vary locally, both of which are unwanted. In addition, objects that have been formed from a print fluid comprising (meth)acrylate monomers frequently have a very low softening point of $T_g$<60° C. and a refractive index of about $n_e$=1.49 to 1.56. Refractive indices of at least 1.56 can be achieved, for example, when aromatic (meth)acrylate monomers are used, but in that case only in association with a low Abbe number, or using at least one sulfur-containing (meth) acrylate, thio(meth)acrylate and/or mercapto thioether.

A fluid to be used in accordance with the disclosure based on a thiol-ene-(meth)acrylate hybrid system enables the production of spectacle lenses having a refractive index $n_e$ of 1.49 to 1.65.

Thiol-ene polymers can have a positive influence on the mechanical properties of (meth)acrylate polymers in a thiol-ene-(meth)acrylate hybrid system, in that the brittle network of the (meth)acrylate polymers becomes more flexible by virtue of the thiol-ene polymers.

Printing inks comprising UV-curing (meth)acrylate monomers, on account of the low viscosity thereof of below 50 mPas (25° C.), usually have good printability by means of inkjet methods.

The fluid to be used in accordance with the disclosure based on a thiol-ene-(meth)acrylate hybrid system typically has a viscosity at the printing temperature of less than 50 mPas, further typically from a range from 5 mPas to 20 mPas, more typically from a range from 7 mPas to 12 mPas and most typically from a range from 8 mPas to 9 mPas. A viscosity from aforementioned ranges is a compromise between very good processability of the thiol-ene-(meth)acrylate hybrid system by means of different printheads or multinozzle arrays and the immobilization of a volume element. The lower the viscosity of the fluid based on a thiol-ene-(meth)acrylate hybrid system is to be within the aforementioned ranges, the greater the preference with which the thiol-ene system comprises at least one low-viscosity vinyl ether.

In thiol-ene-(meth)acrylate hybrid systems, in the course of UV curing, the polyaddition of the thiol-ene component proceeds predominantly in parallel with the polymerization of the (meth)acrylate system. The properties of the resultant copolymer are a combination of poly(meth)acrylate and thiol-ene polymer.

The thiol-ene-(meth)acrylate hybrid system is typically cured by UV polymerization at wavelengths below 420 nm, typically with LED sources. Examples of suitable UV initiators include hydroxyphenyl ketones, α-keto esters, phenylphosphine oxides and/or thioxanthones.

In addition to UV polymerization, thermal post-curing may be advisable if the level of polymerization after the UV irradiation is insufficient. Examples of suitable thermal coinitiators include dialkyl peroxides (e.g., di-tert-amyl peroxides), peroxycarbonates (e.g., tert-butylperoxy-2-ethylhexyl carbonate), hydroperoxides (e.g., cumene hydroperoxide), peroxy esters (e.g., tert-butyl peroxybenzoate). The SADT (self-accelerating decomposition temperature) of the thermal coinitiators should be >60° C. or well above the printing temperature.

The increase in processing time of the thiol-ene-(meth)acrylate hybrid system can be achieved by addition of sterically hindered phenols, for example 2,6-di-tert-butyl-4-methylphenol (BHT), in amounts of 0.1% by weight to 5% by weight, based on the total weight of the thiol-ene-(meth)acrylate hybrid system.

Addition of UV absorbers of the hydroxyphenyl benzotriazole type results in an absorption edge in the thiol-ene-(meth)acrylate hybrid system within a range from 350 nm to 400 nm, depending on the chemical structure of the UV absorber and the concentration thereof in the respective thiol-ene-(meth)acrylate hybrid system.

The advantage of a thiol-ene-(meth)acrylate hybrid system over a (meth)acrylate system is that it is possible here to transmit the reactivity via different polymerization mechanisms partly or fully between volume elements. It is likewise possible to control the mechanical and thermal properties of the polymer formed to a greater degree than in a (meth)acrylate system.

I.2. Fluid to be Used in Accordance with the Disclosure Based on Epoxythiol-(Meth)Acrylate Hybrid Systems Epoxythiol-(meth)acrylate hybrid systems are a combination of at least one epoxythiol system and at least one (meth)acrylate system. The at least one (meth)acrylate system is typically UV-polymerizable. The at least one epoxythiol system comprises at least one epoxy monomer and at least one thiol monomer. The at least one epoxy monomer used is typically an at least difunctional epoxy monomer. The at least one thiol monomer used is typically an at least difunctional thiol monomer. The at least one epoxy monomer used is typically at least one diglycidyl ether. The at least one thiol monomer used is typically at least one difunctional mercapto ester and/or at least one difunctional mercapto thioether.

The at least one (meth)acrylate system comprises at least one (meth)acrylate monomer and/or at least one thio(meth)acrylate monomer. The at least one (meth)acrylate monomer present in the at least one (meth)acrylate system may be at least one monofunctional (meth)acrylate monomer, at least one difunctional (meth)acrylate monomer, at least one trifunctional (meth)acrylate monomer, at least one tetrafunctional (meth)acrylate monomer, at least one pentafunctional (meth)acrylate monomer and/or at least one hexafunctional (meth)acrylate monomer. Typically, the at least one (meth)acrylate system comprises at least one difunctional (meth)acrylate monomer, at least one trifunctional (meth)acrylate monomer, at least one tetrafunctional (meth)acrylate monomer, at least one pentafunctional (meth)acrylate monomer and/or at least one hexafunctional (meth)acrylate monomer. If the at least one (meth)acrylate monomer comprises at least two functional groups in each case, this facilitates the formation of a densely crosslinked polymer network. The at least one thio(meth)acrylate monomer present in the at least one (meth)acrylate system may be at least one monofunctional thio(meth)acrylate monomer, at least one difunctional thio(meth)acrylate monomer, at least one trifunctional thio(meth)acrylate monomer, at least one tetrafunctional thio(meth)acrylate monomer, at least one pentafunctional thio(meth)acrylate monomer and/or at least one hexafunctional thio(meth)acrylate monomer. Typically, the at least one (meth)acrylate system comprises at least one difunctional thio(meth)acrylate monomer, at least one trifunctional thio(meth)acrylate monomer, at least one tetrafunctional thio(meth)acrylate monomer, at least one pentafunctional thio(meth)acrylate monomer and/or at least one hexafunctional thio(meth)acrylate monomer. If the at least one thio(meth)acrylate monomer comprises at least two functional groups, this also facilitates the formation of a densely crosslinked polymer network.

If the epoxythiol-(meth)acrylate hybrid system comprises at least two different epoxy monomers, these may be present in any desired weight ratio to one another.

If the epoxythiol-(meth)acrylate hybrid system comprises at least two different thiol monomers, these may be present in any desired weight ratio to one another. If the epoxythiol-(meth)acrylate hybrid system comprises at least two different (meth)acrylate monomers, these may be present in any desired weight ratio to one another. In the epoxythiol system, the ratio of the at least one epoxy monomer to the at least one thiol monomer is typically stoichiometric.

In the epoxythiol-(meth)acrylate hybrid system, the proportion of the epoxythiol system is typically within a range from 15% by weight to 85% by weight, further typically within a range from 20% by weight to 80% by weight, more typically within a range from 25% by weight to 60% by weight and most typically within a range from 30% by weight to 50% by weight, based in each case on the total weight of the epoxythiol-(meth)acrylate hybrid system.

In the epoxythiol-(meth)acrylate hybrid system, the proportion of the (meth)acrylate system is typically within a range from 5% by weight to 65% by weight, further typically within a range from 10% by weight to 60% by weight, more typically within a range from 15% by weight to 50% by weight and most typically within a range from 20% by weight to 40% by weight, based in each case on the total weight of the epoxythiol-(meth)acrylate hybrid system.

The at least one epoxy monomer used in the epoxythiol-(meth)acrylate hybrid system may, for example, be ethyl glycidyl ether, n-butyl glycidyl ether, 2-ethylhexyl glycidyl ether, C8-C10 glycidyl ether (CAS No. 68609-96-1), C12-C14 glycidyl ether (CAS No. 68609-97-2), cresyl glycidyl ether, p-tert-butylphenyl glycidyl ether, nonylphenyl glycidyl ether, benzyl glycidyl ether, phenyl glycidyl ether, bisphenol A (2,3-dihydroxypropyl) glycidyl ether, diglycidyl ether, ethylene glycol diglycidyl ether, diethylene glycol diglycidyl ether, propylene glycol diglycidyl ether, dipropylene glycol diglycidyl ether, butane-1,4-diol diglycidyl ether, cyclohexane-1,4-dimethanol diglycidyl ether, neopentyl glycol diglycidyl ether, polypropylene glycol (400) diglycidyl ether, hexane-1,6-diol diglycidyl ether, bisphenol A diglycidyl ether, bisphenol A propoxylate diglycidyl ether, polyethylene glycol diglycidyl ether, glycerol diglycidyl ether, resorcinol diglycidyl ether, trimethylolethane triglycidyl ether, trimethylolpropane triglycidyl ether, triphenylolmethane triglycidyl ether, tris(2,3-epoxypropyl) isocyanurate, tris(4-hydroxyphenyl)methane triglycidyl ether, 1,1,1-tris(4-hydroxyphenyl)ethane triglycidyl ether, glycerol triglycidyl ether, glycerol propoxylate triglycidyl ether, N,N-diglycidyl-4-glycidyloxyaniline, pentaerythritol tetraglycidyl ether, dipentaerythritol tetraglycidyl ether, tetraglycidylbenzylethane, sorbitol tetraglycidyl ether, tetraglycidyldiaminophenylmethane, tetraglycidylbisaminomethylcyclohexane.

In the epoxythiol-(meth)acrylate hybrid system, the at least one thiol monomer used may be at least one of the thiol monomers listed in "I.1 Fluid to be used in accordance with the disclosure based on thiol-ene-(meth)acrylate hybrid systems," "I.1 Thiol-ene-(meth)acrylate hybrid system" hereinafter.

In the epoxythiol-(meth)acrylate hybrid system, the at least one (meth)acrylate monomer or the at least one thio(meth)acrylate monomer used may be at least one of the (meth)acrylate monomers or thio(meth)acrylate monomers listed in section "I.1 Thiol-ene-(meth)acrylate hybrid system."

The advantage of an epoxythiol-(meth)acrylate hybrid system over a (meth)acrylate system is that it is possible here to transmit the reactivity via different polymerization mechanisms partly or fully between volume elements. It is likewise possible to control the mechanical and thermal properties of the polymer formed to a greater degree than in a (meth)acrylate system.

I.3 Fluid to be Used in Accordance with the Disclosure Based on Epoxy-(Meth)Acrylate Hybrid Systems Epoxy-(meth)acrylate hybrid systems are a combination of at least one epoxy system and at least one (meth)acrylate system. The at least one (meth)acrylate system is typically UV-polymerizable. The at least one epoxy system comprises at least one epoxy monomer. The at least one epoxy monomer used is typically an at least difunctional epoxy monomer. The at least one epoxy system typically further comprises an at least difunctional polyol or an at least difunctional amine, more typically an at least difunctional polyol.

The at least one (meth)acrylate system comprises at least one (meth)acrylate monomer and/or one thio(meth)acrylate monomer. The at least one (meth)acrylate monomer present in the at least one (meth)acrylate system may be at least one monofunctional (meth)acrylate monomer, at least one difunctional (meth)acrylate monomer, at least one trifunctional (meth)acrylate monomer, at least one tetrafunctional (meth)acrylate monomer, at least one pentafunctional (meth)acrylate monomer and/or at least one hexafunctional (meth)acrylate monomer. Typically, the at least one (meth)acrylate system comprises at least one difunctional (meth)acrylate monomer, at least one trifunctional (meth)acrylate monomer, at least one tetrafunctional (meth)acrylate monomer, at least one pentafunctional (meth)acrylate monomer and/or at least one hexafunctional (meth)acrylate monomer. If the at least one (meth)acrylate monomer comprises at least two functional groups, this facilitates the formation of a densely crosslinked polymer network. The at least one thio(meth)acrylate monomer present in the at least one (meth)acrylate system may be at least one monofunctional thio(meth)acrylate monomer, at least one difunctional thio(meth)acrylate monomer, at least one trifunctional thio(meth)acrylate monomer, at least one tetrafunctional thio(meth)acrylate monomer, at least one pentafunctional thio(meth)acrylate monomer and/or at least one hexafunctional thio(meth)acrylate monomer. Typically, the at least one (meth)acrylate system comprises at least one difunctional thio(meth)acrylate monomer, at least one trifunctional thio(meth)acrylate monomer, at least one tetrafunctional thio(meth)acrylate monomer, at least one pentafunctional thio(meth)acrylate monomer and/or at least one hexafunctional thio(meth)acrylate monomer. If the at least one thio(meth)acrylate monomer comprises at least two functional groups, this also facilitates the formation of a densely crosslinked polymer network.

If the epoxy-(meth)acrylate hybrid system comprises at least two different epoxy monomers, these may be present in any desired weight ratio to one another. If the epoxy-(meth)acrylate hybrid system comprises at least two different (meth)acrylate monomers, these may be present in any desired weight ratio to one another.

If the epoxy system, as well as at least one epoxy monomer, comprises at least one polyol, the molar ratio of the at least one epoxy monomer to the at least one polyol is typically within a range from 1.2:1 to 10:1.

If the epoxy system, as well as at least one epoxy monomer, comprises at least one polyol, the proportion of the at least one epoxy monomer is typically within a range from 65% by weight to 99% by weight, further typically within a range from 70% by weight to 98% by weight, more typically within a range from 75% by weight to 94% by weight and most typically within a range from 80% by weight to 92% by weight, based in each case on the total weight of the epoxy system. The proportion of the at least one polyol is typically within a range from 1% by weight to 35% by weight, further typically within a range from 2% by weight to 30% by weight, more typically within a range from 6% by weight to 25% by weight and most typically within a range from 8% by weight to 20% by weight, based in each case on the total weight of the epoxy system.

In the epoxy-(meth)acrylate hybrid system, the proportion of the epoxy system is typically within a range from 15% by weight to 85% by weight, further typically within a range from 20% by weight to 80% by weight, more typically within a range from 30% by weight to 50% by weight and most typically within a range from 40% by weight to 60% by weight, based in each case on the total weight of the epoxy-(meth)acrylate hybrid system.

In the epoxy-(meth)acrylate hybrid system, the proportion of the (meth)acrylate system is typically within a range from 15% by weight to 85% by weight, further typically within a range from 20% by weight to 80% by weight, more typically within a range from 30% by weight to 50% by weight and most typically within a range from 40% by weight to 60% by weight, based in each case on the total weight of the epoxy-(meth)acrylate hybrid system.

The at least one epoxy monomer present in the epoxy-(meth)acrylate system may, for example, be at least one of the epoxy monomers listed in section "I.2. Fluid to be used in accordance with the disclosure based on epoxythiol-(meth)acrylate hybrid systems," "I.2 Epoxythiol-(meth)acrylate hybrid system" hereinafter.

The at least one (meth)acrylate monomer present in the epoxy-(meth)acrylate system may, for example, be at least one of the (meth)acrylate monomers and/or thio(meth)acrylate monomers listed in section "I.1 Thiol-ene-(meth)acrylate hybrid system."

The at least one polyol present in the epoxy-(meth)acrylate system may be at least one di-, tri-, tetra-, penta- or hexafunctional polyol or an oligomeric polyol. Aliphatic polyols used may, for example, be ethylene glycol, cyclohexanedimethanol, triethylene glycol, 1,2-propylene glycol, 1,4-butylglycol, pentane-1,5-diol, propane-1,2,3-triol, hexane-1,2,6-triol, pentaerythritol, 2,2-bis(4-hydroxycyclohexyl)propane. An oligomeric polyol may come, for example, from the group of the polyester polyols or polyether polyols.

The advantage of an epoxy-(meth)acrylate hybrid system over a (meth)acrylate system is that it is possible here to transmit the reactivity via different polymerization mechanisms partly or fully between volume elements. It is likewise possible to control the mechanical and thermal properties of the polymer formed to a greater degree than in a (meth)acrylate system.

II Fluid to be Used in Accordance with the Disclosure Based on Systems Comprising at Least One Photolatent Catalyst The controlled activation of the respective reaction within at least one volume element, within at least one volume composite, within at least one homogeneous volume composite, between adjacently applied and/or mutually adjoining volume elements and/or between adjacently applied and/or mutually adjoining volume composites and/or between adjacently applied and/or mutually adjoining homogeneous volume composites is typically achieved by means of at least one photolatent catalyst. The principle of action of a photolatent catalyst is based on the controlled release of the active catalyst by exposure of an inactive or distinctly less active precursor of the catalyst in the UV and/or VIS region. The controlled release of the at least one active catalyst offers the advantage that a reaction catalyzable by this at least one active catalyst commences only at the desired juncture. This in turn has the effect that the processing time of a material comprising the inactive or distinctly less active precursor of the at least one catalyst is distinctly increased. The differences in catalyst strength of a photolatent base, for example, may be up to 4 orders of magnitude. Typically, the processing time of a material comprising the inactive or distinctly less active precursor of the at least one catalyst is ≥10 minutes, more typically ≥1 hour, and most typically more than 1 day. In addition, a material comprising the inactive or distinctly less active precursor of the at least one catalyst may comprise at least one photosensitizer in addition to the catalyst precursor. A fluid comprising at least one photolatent catalyst may also exhibit dark curing or shadow curing in regions that have not been directly exposed.

At least one photolatent catalyst used may be at least one photolatent base (PLB) and/or at least one photolatent acid. The at least one photolatent catalyst used is typically at least one photolatent base.

The at least one photolatent acid used is typically at least one diaryliodonium salt ($Ar_2I^+$) or at least one triarylsulfonium salt ($Ar_3S^+$).

The fluid to be used in accordance with the disclosure comprises the at least one photolatent acid in a total proportion typically from a range from 0.001% by weight to 2% by weight, more typically from a range from 0.1% by weight to 1.0% by weight and especially typically from a range from 0.2% by weight to 0.5% by weight, based in each case on the total weight of the fluid to be used in accordance with the disclosure. Aforementioned ranges are applicable both to the use of a single type of photolatent acid and to mixtures of different photolatent acids.

The at least one photolatent base used is typically at least one of the photolatent base compounds according to WO 03/033500 A1 or according to WO 2008/119688 A1. Further typically, the at least one photolatent base used is at least one of the photolatent base compounds according to WO 03/033500 A1, claim 1, or according to WO 2008/119688 A1, claim 1. More typically, the at least one photolatent base used is at least one photolatent base according to WO 03/033500 A1, claim 1, or according to WO 03/033500 A1, example 1, 5-benzyl-1,5-diazabicyclo[4.3.0]nonane.

The fluid to be used in accordance with the disclosure comprises the at least one photolatent base in a total proportion typically from a range from 0.001% by weight to 5.0% by weight, more typically from a range from 0.1% by weight to 2.0% by weight and especially typically from a range from 0.2% by weight to 1% by weight, based in each case on the total weight of the fluid to be used in accordance with the disclosure. Fluids comprising at least one photolatent base have particularly favorable polymer formation, since the respective curing mechanisms are effective both in the case of shadow curing and in the case of exposure, and hence the same polymer structure is formed. Aforementioned ranges are applicable both to the use of a single type of photolatent base and to mixtures of different photolatent bases.

II.1 Fluid to be Used in Accordance with the Disclosure Based on an Epoxy-Polyol System Comprising at Least One Photolatent Acid Photolatent acids are used, for example, in formulations comprising at least one epoxy monomer. Typical representatives of a photolatent acid are, for example, diaryliodonium salts ($Ar_2I^+$) or the thermally very stable triarylsulfonium salts ($Ar_3S^+$). Formulations comprising photolatent acids generally do not show any oxygen inhibition and generally have dark curing or shadow curing in regions that have not been exposed. One example of a formulation comprising at least one epoxy monomer is the formulation that follows, which can be cationically cured after exposure with release of the triarylsulfonium salt:

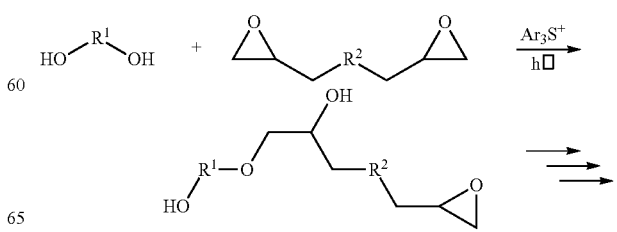

The reaction rate of the uncatalyzed reaction between the polyol and the epoxy monomer is so slow that no significant dark reaction or shadow reaction proceeds. The curing reaction may be influenced, for example, by the concentration of the triarylsulfonium salt, by the choice of exposure wavelength, the intensity of the radiation source and the exposure time, and also the temperature.

The epoxy-polyol system comprises the at least one photolatent acid in a total proportion typically from a range from 0.001% by weight to 2% by weight, more typically from a range from 0.1% by weight to 1.0% by weight and especially typically from a range from 0.2% by weight to 0.5% by weight, based in each case on the total weight of the epoxy-polyol system. Aforementioned ranges are applicable both to the use of a single type of photolatent acid and to mixtures of different photolatent acids.

II.2 Fluid to be Used in Accordance with the Disclosure Based on an Epoxythiol System Comprising at Least One Photolatent Base

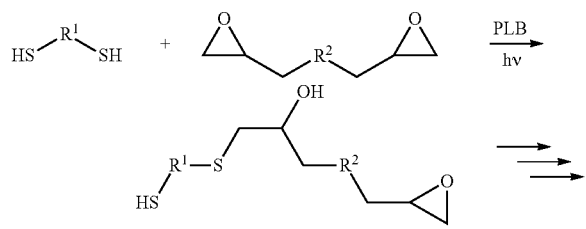

The epoxythiol system comprises at least one epoxy monomer and at least one thiol monomer and/or a thiol oligomer. Typically, the epoxythiol system comprises an at least difunctional epoxy monomer as at least one epoxy monomer. Typically, the epoxythiol system comprises an at least difunctional thiol monomer as at least one thiol monomer.

The epoxythiol system may comprise, for example, at least one of the epoxy monomers listed in section "I.2 Epoxythiol-(meth)acrylate hybrid system."

The epoxythiol system may comprise, for example, at least one of the thiol monomers listed in section "I.1 Thiol-ene-(meth)acrylate hybrid system."

The at least one epoxy monomer and the at least one thiol monomer are typically present stoichiometrically in the epoxythiol system relative to one another.

The at least one photolatent base used is typically at least one of the photolatent base compounds according to WO 03/033500 A1, claim 1, or according to WO 2008/119688 A1, claim 1. More typically, the at least one photolatent base used is at least one photolatent base according to WO 03/033500 A1, claim 1, or according to WO 03/033500 A1, example 1, 5-benzyl-1,5-diazabicyclo[4.3.0]nonane.

The epoxythiol system comprises the at least one photolatent base in a total proportion typically from a range from 0.001% by weight to 5.0% by weight, further typically from a range from 0.1% by weight to 2.0% by weight and especially typically from a range from 0.2% by weight to 1% by weight, based in each case on the total weight of the epoxythiol system. Aforementioned ranges are applicable both to the use of a single type of photolatent base and to mixtures of different photolatent bases.

The epoxy-thiol system is typically mixed directly prior to printing. As soon as the epoxy-thiol system is exposed, the polymerization reaction is accelerated very significantly. However, the reaction rates are much lower compared to the (meth)acrylate systems, and so it is readily possible for adjacent volume elements to form a homogeneous volume composite. In particular, the simultaneous production of the base in the volume results in more homogeneous crosslinking. As a result of insensitivity toward oxygen, there is also no marked surface layer. By virtue of the specific form of the photolatent base, curing is additionally possible even without exposure or under inhomogeneous radiation distribution, i.e., shadow curing is also possible; the same polymer is formed throughout.

The use of at least one thiol monomer results in a high refractive index, with both adjustability of the refractive index and variability of the dispersion ($n_e$ (23° C.)=1.52 to 1.65). In addition, the reactivity may be influenced by the concentration of the photolatent base, by the choice of exposure wavelength, the intensity of the radiation source and the exposure time, and also the temperature.

III Fluid to be Used in Accordance with the Disclosure Based on Hybrid Systems Comprising at Least One Photolatent Catalyst III.1 Fluid to be Used in Accordance with the Disclosure Based on Epoxythiol-Thiol/Ene Hybrid Systems Comprising at Least One Photolatent Base The epoxythiol-thiol/ene hybrid system comprises a combination of at least one epoxythiol system and at least one thiol/ene system. Production of the epoxythiol system requires at least one epoxy monomer and at least one thiol monomer. The at least one epoxy monomer here typically comprises an at least difunctional epoxy monomer. Further typically, the at least one thiol monomer usable in the epoxythiol system comprises an at least difunctional thiol monomer. Production of the thiol/ene system requires at least one thiol monomer and at least one ene monomer. Typically, the at least one thiol monomer usable for production of the thiol/ene system comprises an at least difunctional thiol monomer. Further typically, the at least one ene monomer usable for production of the thiol/ene system comprises an at least difunctional ene monomer. The at least one thiol monomer usable in the epoxythiol system may be the same as or different than the at least one thiol monomer usable in the thiol/ene system. Typically, the at least one thiol monomer usable in the epoxythiol system is the same as the at least one thiol monomer usable in the thiol/ene system.

For production of the epoxythiol-thiol/ene hybrid system, the at least one epoxy monomer used may, for example, be at least one of the epoxy monomers mentioned in section "1.2 Epoxythiol-(meth)acrylate hybrid system."

For production of the epoxythiol-thiol/ene hybrid system, the at least one thiol monomer used may, for example, be at least one of the thiol monomers mentioned in section "I.1 Thiol-ene-(meth)acrylate hybrid system."

The ene monomer used for production of the epoxythiol-thiol/ene hybrid system is typically at least one at least monofunctional vinyl compound and/or at least one at least monofunctional allyl compound. For example, the at least one ene monomer used may be at least one of the vinyl compounds and/or allyl compounds mentioned in section "I.1 Thiol-ene-(meth)acrylate hybrid system."

In the epoxythiol-thiol/ene hybrid system, the epoxythiol system and the thiol/ene hybrid system are typically each in a stoichiometric ratio.

In the epoxythiol-thiol/ene hybrid system, the proportion of the epoxythiol system is typically within a range from 15% by weight to 55% by weight, further typically within a range from 20% by weight to 50% by weight, more typically within a range from 35% by weight to 45% by weight and most typically within a range from 30% by weight to 40% by weight, based in each case on the total weight of the epoxythiol-thiol/ene hybrid system.

In the epoxythiol-thiol/ene hybrid system, the proportion of the thiol/ene system is typically within a range from 2% by weight to 25% by weight, further typically within a range from 3% by weight to 22% by weight, more typically within a range from 5% by weight to 20% by weight and most typically within a range from 8% by weight to 15% by weight, based in each case on the total weight of the epoxythiol-thiol/ene hybrid system.

If the epoxythiol-thiol/ene hybrid system is produced using at least two different epoxy monomers, these may be present in any desired weight ratio to one another. If the epoxythiol-thiol/ene hybrid system is produced using at least two different thiol monomers, these may be present in any desired weight ratio to one another. If the epoxythiol-thiol/ene hybrid system is produced using at least two different ene monomers, these may be present in any desired weight ratio to one another.

The epoxythiol-thiol/ene hybrid system is produced using at least one photolatent base. The photolatent base used is typically at least one of the photolatent base compounds according to WO 03/033500 A1, claim 1, or according to WO 2008/119688 A1, claim 1. More typically, the at least one photolatent base used is at least one photolatent base according to WO 03/033500 A1, claim 1, or according to WO 03/033500 A1, example 1, 5-benzyl-1,5-diazabicyclo[4.3.0]nonane.

The epoxythiol-thiol/ene hybrid system is produced using the at least one photolatent base in a total proportion typically from a range from 0.01% by weight to 5.0% by weight, more typically from a range from 0.1% by weight to 3.0% by weight and most typically from a range from 0.5% by weight to 2.0% by weight, based in each case on the total weight of the epoxythiol-thiol/ene hybrid system. Aforementioned ranges for the total proportion are applicable both to the use of just a single type of photolatent base and to use of at least two different photolatent bases.

The epoxythiol-thiol/ene hybrid system is also typically produced using at least one photoinitiator in a total proportion typically from a range from 0.01% by weight to 2.0% by weight, more typically from a range from 0.1% by weight to 1.5% by weight and especially typically from a range from 0.2% by weight to 1.0% by weight, based in each case on the total weight of the epoxythiol-thiol/ene hybrid system. Aforementioned ranges for the total proportion are applicable both to the use of just a single type of photoinitiator and to use of at least two different photoinitiators. The at least one photoinitiator may, for example, be 2-hydroxy-2-methyl-1-phenylpropan-2-one (Omnicure 1173, IGM Resins B.V.).

The activation is typically effected within a range from 200 nm to 450 nm, further typically from 280 nm to 420 nm, and most typically within a range from 365 nm to 405 nm. Further typically, the activation is effected with a radiation dose typically from a range from 0.1 Fein' to 20 Fein', further typically from a range from 0.2 Fein' to 5 Fein', more typically from a range from 0.5 Rem' to 2 Rem'. In the inkjet method, the activation may follow after application of at least two adjacently applied and/or mutually adjoining volume elements, after application of at least one layer of volume elements, after formation of at least one volume composite and/or after formation of at least one homogeneous volume composite. Final activation is typically effected for transformation of a homogeneous volume composite to a final volume composite. The final activation can be effected in a different wavelength range and/or with a different radiation dose. For final activation, a thermal treatment is optionally additionally possible. Optionally, a final volume composite may finally be subjected to thermal treatment.

The advantage of an epoxythiol-thiol/ene hybrid system over a (meth)acrylate system is that it is possible here to transmit the reactivity via different polymerization mechanisms to partly or fully between volume elements. It is likewise possible to control the mechanical and thermal properties of the polymer formed to a greater degree than in a (meth)acrylate system.

III.2 Fluid to be Used in Accordance with the Disclosure Based on Epoxythiol-(Meth)Acrylate Hybrid Systems Comprising at Least One Photolatent Base Epoxythiol-(meth)acrylate hybrid systems are a combination of at least one epoxythiol system and at least one (meth)acrylate system, as already described in section "1.2 Epoxythiol-(meth)acrylate hybrid system." In the epoxythiol system, the at least one epoxy monomer is typically used stoichiometrically relative to the at least one thiol monomer. If different epoxy monomers and/or different thiol monomers are used in the epoxythiol system, the different epoxy monomers and/or the different thiol monomers may each be used in any desired weight ratio relative to one another.

In the epoxythiol-(meth)acrylate hybrid system, the proportion of the epoxythiol system is typically within a range from 20% by weight to 80% by weight, further typically within a range from 22% by weight to 70% by weight, more typically within a range from 25% by weight to 60% by weight and most typically within a range from 30% by weight to 50% by weight, based in each case on the total weight of the epoxythiol-(meth)acrylate hybrid system.

In the epoxythiol-(meth)acrylate hybrid system, the proportion of the (meth)acrylate system is typically within a range from 10% by weight to 60% by weight, further typically within a range from 13% by weight to 55% by weight, more typically within a range from 15% by weight to 50% by weight and most typically within a range from 20% by weight to 40% by weight, based in each case on the total weight of the epoxythiol-(meth)acrylate hybrid system.

The proportion of the at least one photolatent base in the epoxythiol-(meth)acrylate hybrid system is typically within a range from 0.001% by weight to 5.0% by weight, further typically from a range from 0.1% by weight to 2.0% by weight and especially typically from a range from 0.2% by weight to 1% by weight, based in each case on the total weight of the epoxythiol-(meth)acrylate hybrid system. Aforementioned ranges are applicable both to the use of a single type of photolatent base and to mixtures of different photolatent bases.

In relation to the monomers to be used with preference in the epoxythiol-(meth)acrylate hybrid system, reference is made to the details in section "1.2 Epoxythiol-(meth)acrylate hybrid system." In relation to the photolatent base to be used with preference in the epoxythiol-(meth)acrylate hybrid system, reference is made to the details in section "II Material to be used in accordance with the disclosure based on systems comprising at least one photolatent catalyst."

The advantage of an epoxythiol-(meth)acrylate hybrid system over a (meth)acrylate system is that it is possible here to transmit the reactivity via different polymerization mechanisms partly or fully between volume elements. It is likewise possible to control the mechanical and thermal properties of the polymer formed to a greater degree than in a (meth)acrylate system.

IV Fluid to be Used in Accordance with the Disclosure Based on a Thiol-Ene System

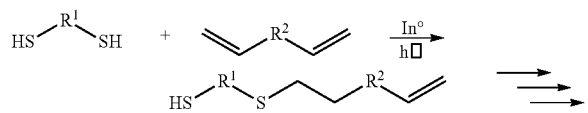

The thiol-ene system utilizes the thiol-ene reaction as curing mechanism. This reaction initiated by a free-radical initiator does not experience any oxygen inhibition. By virtue of a relatively high proportion of sulfur-containing monomers, in turn, a high refractive index is enabled, with adjustability of refractive index and dispersion ($n_e$ (23° C.) 1.50-1.65). In addition, the curing reaction may be influenced by the concentration of the free-radical initiator, by the choice of exposure wavelength, the intensity of the radiation source and the exposure time, and also the temperature.

The fluids to be used above in the sections "I Fluid to be used in accordance with the disclosure based on hybrid systems," "II Material to be used in accordance with the disclosure based on systems comprising at least one photolatent catalyst," "III Fluid to be used in accordance with the disclosure based on hybrid systems comprising at least one photolatent catalyst" and "IV Fluid to be used in accordance with the disclosure based on a thiol-ene system" may optionally comprise at least one additive which serves, for example, to improve the adhesion of the fluid on a substrate to be printed, to improve the printability of the fluid, to improve the flow characteristics of the fluid, to improve the wettability of the substrate, to increase the processing time, to optimize droplet formation and/or to avoid foam. Alternatively or additionally, the fluid to be used may optionally comprise at least one additive selected from UV absorbers, light stabilizers, stabilizers, biocides and dyes.

The fluid to be used in accordance with the disclosure may be applied to a wide variety of different substrates. After application to a substrate and subsequent curing of the fluid to be used in accordance with the disclosure, the spectacle lens obtained from the fluid to be used in accordance with the disclosure may remain bonded to the substrate and may form the finished spectacle lens together with the substrate. Alternatively, the fluid to be used in accordance with the disclosure, after application to a substrate and subsequent curing, may be separated from the substrate and may form the finished spectacle lens without the substrate. The substrate in the latter case serves as support material to be removed again and/or as mold.

If the substrate together with at least one cured volume element and/or with at least one final volume composite forms the finished spectacle lens, the substrate may comprise at least one polymeric material and/or at least One mineral glass. The polymeric material or the mineral glass here may each take the form of a lens blank, i.e., of a preformed piece of material for production of a lens in any state prior to completion of surface processing according to DIN EN ISO 13606:2013-10, paragraph 8.4.1, of a semifinished spectacle lens, i.e., of a lens blank having just one optically ready-processed face according to DIN EN ISO 13666:2013-10, paragraph 8.4.2, or of a finished spectacle lens, i.e., of a spectacle lens having two ready-processed optical faces before or after edge processing according to DIN EN ISO 13666:2013-10, paragraph 8.4.6. The semifinished lens blanks nay take the form of single-vision semifinished lens blanks, multifocal semifinished lens blanks or progressive-power semifinished lens blanks according to DIN EN ISO 13666:2013-10, paragraphs 8.4.3, 8.4.4 and 8.4.5. The finished lenses may be single-vision lenses, multifocal lenses, bifocal lenses, trifocal lenses, progressive-power lenses degressive-power lenses pursuant to DIN EN ISO 13666:2013-10 paragraphs 8.3.1, 8.3.2, 8.3.3, 8.3.4, 8.3.5 and 8.1.6. The lens blanks, semifinished lens blanks or finished lenses usable as substrate may be based, for example, on the base materials specified in table 1 below.

TABLE 1

Examples of base materials for lens blanks, semifinished lens blanks or finished lenses

| Trade name | Base material | Average refractive index $n_D$* | Abbe number $v_D$ |
|---|---|---|---|
| CR-39, CR-330, CR-607, CR-630, RAV 700, RAV 7NG, RAV 7AT, RAV 710, RAV 713, RAV 720 | Poly(allyldiglycol carbonate), (PADC) | 1.500 | 56 |
| RAVolution | Polyurea/Polyurethane | 1.500 | 54 |
| Trivex | Polyurea/Polyurethane | 1.530 | 45 |
| Panlite, Lexan, Makrolon | Polycarbonate (PC) | 1.586 | 29 |
| MR-6 | Polythiourethane | 1.598 | |
| MR-8 | Polythiourethane | 1.598 | 41 |
| MR-7 | Polythiourethane | 1.664 | 32 |
| MR-10 | Polythiourethane | 1.666 | 32 |
| MR-174 | Polyepisulfide | 1.738 | 32 |
| MGC 1.76 | Polyepisulfide | 1.76 | 30 |
| | Mineral 1.5 | 1.525 | 58 |
| | Mineral 1.6 | 1.604 | 44 |
| | Mineral 1.7 | 1.701 | 39.2 |
| | Mineral 1.8 | 1.802 | 34.4 |
| | Mineral 1.9 | 1.885 | 30 |

*Based on the sodium D line

When a lens blank is used as substrate, it is possible to provide either just one or both of the faces with at least one volume element. If just one of the two faces is provided with at least one volume element, the opposite face is typically transformed to an optically ready-processed faced by mechanical processing, for example machining and/or grinding and/or turning and/or polishing.

When a semifinished spectacle lens is used as substrate, either the optically ready-processed face or the opposite face may be provided with at least one volume element. If the optically ready-processed face is provided with at least one volume element, the opposite face is typically transformed to an optically ready-processed faced by mechanical processing, for example machining and/or grinding and/or turning and/or polishing.

When a finished spectacle lens is used as substrate, it is possible to provide either just one or both of the ready-processed optical faces with at least one volume element. Typically, just one of the ready-processed optical faces is provided with at least one volume element.

Particular preference is given to using a finished spectacle lens as substrate.

Very particular preference is given to using at least one thin lens as substrate. The surface topography of the thin lens may, for example, be spherical, aspherical, toric, atoric, planar or progressive. A thin lens having a planar surface topography may be reshaped by means of a convex- or concave-shaped mold shell that has the negative shape and negative surface topography of the thin lens to be produced. A thin lens having a planar surface topography is understood to mean a thin lens without macroscopic visible bending or curvature. Preference is given to applying at least one volume element or at least one final volume composite to the reverse face of the thin lens. The reverse face of the thin lens is that face which, after completion of the spectacle lens, faces the eye in a spectacle frame; the front face of the thin lenses is that face which, after completion of the spectacle lens, faces away from the eye in a spectacle frame.

The at least one thin lens may be based on various glass corn positions, for example borosilicate glass, aluminoborosilicate glass or alkali-free borosilicate glass. The at least one thin lens is typically based on a borosilicate glass or an aluminoborosilicate glass.

The at least one thin lens typically has an average thickness from a range from 10 µm to 1000 µm, further from a range from 20 µm 800 µm, further typically from a range from 30 µm to 500 µm, more typically from a range 40 µm to 300 µm and most typically from a range from 50 µm to 3000 µm. The at least one thin lens more typically has an average thickness from a range from 100 µm to 250 µm. The average thickness of the at least one thin lens is understood to mean the arithmetic average Below an average thickness of 10 µm, the at least one thin lens is too mechanically unstable to be utilizable as substrate in an inkjet method without breaking of the at least one thin lens. Above ail average thickness of 1000 µm, the at least one thin lens can lead to spectacle lenses that would have too great an edge thickness or too great a middle thickness. The average thickness of the at least one thin lens is typically determined with a chromatic-confocal sensor, for example the ConfocalDT IFS2405 sensor from Micro-Epsilon Messtechnik GmbH & Co. KG, or interferometry sensor, for example the CHRocodile 2 IT sensor from Precitec GmbH & Co. KG. The average thickness of the at least one thin lens is typically determined on the basis of the at least one thin lens before the application of at least one volume element.

The at least one thin lens typically has a surface roughness Ra of <10 nm. Further typically, the surface roughness Ra of the at least one thin lens is within a range from 0.1 nm to 0.8 nm, more typically within a range of 0.3 nm to 0.7 nm and most typically in a range of 0.4 nm to 0.6 nm. The aforementioned values for the surface roughness Ra are each based on the front face and the reverse face of the at least one unformed planar thin lens. After forming, the aforementioned values are each applicable solely to that surface of the at least one thin lens which has not been brought into contact with the shaped body used for forming. Depending on the shaped body used for forming, the aforementioned values may also be applicable to the surface of the at least one thin lens that was in contact with the shaped body used for forming. The surface roughness of the at least one thin lens is typically determined by means of white-light interferometry, typically using the New View 7100 instrument (from Zygo Corporation). If the at least one thin lens has further unevennesses, the area analysis of the respective surface car: also be determined by phase-measuring ectometry, typically with the SpecGage instrument (from 3D-Shape GmbH).

The at least one thin lens may comprise at least one colorant or no colorant. The at least one thin lens typically does not comprise any colorant.

Further typically, the transmittance of the at least one thin lens without colorant in the wavelength range from 400 nm to 800 nm is ≥90%, more typically ≥92%. The transmittance of the at least one thin lens without colorant is typically determined by means of a UV/VIS spectrophotometer, typically with the LAMBDA 950 UV/Vis/NIR Spectrophotometer (from Perkin Elmer Inc.).

The at least one thin lens typically has a refractive index from a range of n=1.490 to n=1.950, further typically from a range of n=1.501 to n=1.799, more typically from a range of n=1.510 to n=1.755 and most typically from a range from n=1.521 to n=1.747, where the refractive index at a temperature of 21° C. is reported for the wavelength of the sodium D line.

Thin lenses are commercially available, for example, under the D 263® T eco, D 263® LA eco, D 263® M, AF 32® eco, SCHOTT AS 87 eco, B 270® i names, each from Schott AG, Corning Willow Glass or Corning Gorilla Glass, each from Corning Inc.

The substrate may not have an optical correction effect. Alternatively, the substrate may be endowed with an optical correction effect and/or an aberration correction for the viewing eye. Optical correction effect is understood to mean spherical correction, astigmatic correction and correction of the axis position and optionally correction by a prism with a base setting. This optical correction effect is conventionally implemented for distance viewing or close viewing in single-vision lenses. In the case of multifocal spectacle lenses, bifocal spectacle lenses, trifocal spectacle lenses, varifocal spectacle lenses or degressive spectacle lenses, the optical correction effect for distance vision and/or for close vision may in each case include a spherical correction, an astigmatic correction, a correction of the axis position and optionally a correction by a prism with a base setting. Aberration correction for the viewing eye, regardless of whether the aberration correction is for near vision or distance vision, is typically calculated analogously to Werner Köppen "Konzeption and Entwicklung von Gleitsichtgläsern" [Design and Development of Varifocal Lenses], Deutsche Optiker Zeitschrift DOZ, October 1995, pages 42-45. For this purpose, the surface properties of at least one substrate surface, in an optimization process, are varied by iteration until a desired aberration distribution for the viewing eye has been attained within a defined tolerance, i.e., until the merit function has gone below a defined value.

If the substrate to be coated has already been endowed with an optical correction effect and/or an aberration correction for the viewing eye, the at least one volume element to be applied may serve to alter the optical correction effect and/or the aberration correction for the viewing eye.

If the substrate comprises both at least one polymeric material and at least one mineral glass, the mineral glass typically takes the form of a thin lens, and the polymeric material typically takes the form of a semifinished lens blank or of a finished lens or of at least one polymer film.

If the substrate comprises at least one thin lens and at least one polymer film as polymeric material, the at least one polymer film is typically disposed between at least two thin lenses. The at least one polymer film is typically based on polyethylene, polypropylene, polyethylene terephthalate, polyethylene naphthalate, polycarbonate, polymethylmethacrylate, polyvinyl chloride, polyvinyl acetate, polyvinyl butyrate and/or mixtures thereof. The at least one polymer film may be stabilized with cellulose triacetate, for example. The at least one polymer film may be colored or uncolored. If the substrate that comprises at least a polymer film and at least a thin lens is to be colored, the at least one polymer film is typically colored. The at least one polymer film typically has an average thickness from a range from 10 µm to 600 µm, further typically from a range from 50 µm to 400 µm and most typically from a range from 80 µm to 250 µm.

If, in this exemplary embodiment, the substrate to be coated comprises at least one thin lens and at least one finished spectacle lens as polymeric material, at least one thin lens may be on the front face and/or on the reverse face of the finished spectacle lens. Typically, at least one thin lens is on the front face of the finished spectacle lens and at least one volume element is applied to the reverse face of the finished spectacle lens.

If, in this exemplary embodiment, the substrate to be coated comprises at least one thin lens and at least one semifinished spectacle lens product as polymeric material, preference is given to first processing the optically unfinished face and then bonding the front face and/or the reverse face of the finished spectacle lens thus obtained to at least one thin lens. Alternatively, in the case of use of a semifinished lens blank as polymeric material, the at least one thin lens is bonded to the already finished optical surface, the optically unfinished surface is processed, and then this processed surface is optionally bonded to at least one further thin lens. Bonding to at least one further thin lens is typical here. Typically, the finished optical surface of the semifinished lens blank is the front face thereof, and the optically unfinished surface is the reverse face thereof. As an alternative to the transformation of the optically unfinished face to a second optically finished face and the bonding thereof to at least one thin lens, this second face, before or after transformation to a second optically finished face, may be provided with at least one volume element or at least one coating. This coating is typically selected from the group consisting of at least one hardcoat layer, at least one antireflection layer, at least one antifog layer, at least one electrically conductive or electrically semiconductive layer, and at least one cleancoat layer. Particular preference is given to at least one hardcoat layer, at least one antireflection layer and at least one cleancoat layer as coating, in which case the at least one hardcoat layer is the layer closest to the substrate and the at least one cleancoat layer is the layer furthest removed from the substrate. If the surface of the substrate provided with at least one volume element is to be provided with at least one coating, this at least one coating may be selected from the group consisting of at least one hardcoat layer, at least one antireflection layer, at least one antifog layer, at least one electrically conductive or electrically semiconductive layer, at least one photochromic layer, at least one coloring layer and at least one cleancoat layer.

The at least one thin lens bonded to the front face of the finished spectacle lens may be identical or different, for example in respect of glass composition, average thickness and/or shape, to the at least one thin lens bonded to the reverse face of the finished spectacle lens. The same also applies in the case of use of at least one semifinished lens blank or at least one polymer film as polymeric material. In the case of use of a semifinished lens blank, the optically unfinished surface, prior to the bonding to at least one thin lens, is transformed to an optically finished surface.

The bonding of the at least one thin lens to the optically finished surface, typically the front face, of the semifinished lens blank, or to one of the finished optical surfaces, typically the front face, of the finished lens is typically cohesive and form-fitting. The reverse face of the at least one thin lens and/or the optically finished front face of the semifinished lens blank or of the finished lens may be provided with at least one coating. This at least one coating may comprise at least one coloring layer, at least one photochromic layer and/or at least one polarizing layer.

The optional, preferred bonding of the second, finished optical surface of the semifinished lens blank or of the finished lens to at least one further thin lens is typically likewise cohesive and form-fitting.

The front face and/or the reverse face of the at least one thin lens can each be coated by means of a PVD method and/or a wet coating process such as dip- or spin-coating. The subsequent curing of the coating obtained by wet coating methods can be effected either thermally or by radiation curing. Typically, this coating is cured by radiation curing.

The bonding of the respectively optically finished surface of the semifinished lens blank or of the at least one finished optical surface of the finished lens or of the at least one polymer film to the at least one thin lens in each case is typically effected by an adhesive means. The adhesive means may serve here, for example, as primer or compensation material for the different thermal expansion of the individual components. In addition, via the selection of the adhesive, matching of any difference in refractive index $\Delta n_e$ that exists between the individual components can be achieved. What is typically effected here is not just the matching of the refractive index $n_e$ but also the matching of the dispersion, such that the change in the refractive index of the individual components is the same across the visible spectrum. Usable adhesive means are described, for example, in DE 10 2012 210 185 A1, WO 2009/056196 A1 or WO 2015/121341 A1. Typically, the individual components are bonded to one another by means of an adhesive means based on an amine-catalyzed thiol hardening of epoxy resins analogously to WO 2015/121341 A1, especially analogously to claim 1 of WO 2015/121341 A1, at a temperature from a range from 20° C. to 80° C., typically from a range from 40° C. to 70° C. and more typically from a range from 45° C. to 65° C.

There may be at least one layer between the surface of the at least one thin lens facing the ready-processed optical face of the semifinished spectacle lens or of the finished spectacle lens and the ready-processed optical face. This at least one layer typically has the same surface topography as the respective surface beneath to which this at least one layer has been applied. Slight differences in the surface topography of the two surfaces to be joined to one another can be filled, for example, by means of an adhesive means. For form-fitting bonding of the respective surfaces, it is preferable that the radii of curvature of the components to be respectively bonded to one another typically differ from one another by less than 1 mm, further typically within a range from 0.03 mm to ≤0.8 mm, more typically within a range from 0.04 mm to ≤0.7 mm and most typically within a range from 0.05 mm to ≤0.6 mm.

The at least one thin lens and the semifinished lens blank or the finished lens, before being joined by means of an adhesive means, typically have the same diameter and the same radius of curvature. Typically, the at least one polymer film has a diameter sufficiently great that the at least one polymer film completely covers the front face of the eyeside thin lens and the reverse face of the object-side thin lens. Any excess polymer film is typically cut off. If the at least one polymer film already has the same radius of curvature as the thin lens to be bonded thereto, the at least one polymer film typically has the same diameter as the thin lens.

If a final volume composite is to be separated again from the substrate, prior to the application of the at least one volume element to the substrate, this may be provided with at least one adhesive layer or at least one separating layer, for example with a layer of an organomodified silane or siloxane. The substrate may also be provided with the desired coating of the spectacle lens, which is then separated from the substrate along with the final volume composite.

Irrespective of whether a resultant final volume composite is or is not removed again from a substrate after the application of one of the above-described fluids to the substrate, it is preferable that the resultant final volume composite, at least on the surface remote from the substrate, is not subjected to any mechanical treatment, for example machining and/or grinding and/or turning and/or polishing.

EXAMPLES

I Production of a Fluid of the Disclosure

Example 1: Production of a Fluid Based on a Thiol-Ene-(Meth)Acrylate Hybrid System

|  |  | % by wt. |
|---|---|---|
| Part A |  |  |
| Pentaerythritol tetrakis(3-mercaptopropionate) | PETMP | 52.63 |
| Part B |  |  |
| 1,3,5-Triallyl-1,3,5-triazine-2,4,6-(1H,3H,5H)-trione | TTT | 36.26 |
| Hexane-1,6-diol diacrylate | HDDA | 9.07 |
| 2,6-Di-tert-butyl-4-methylphenol | BHT | 0.45 |
| 2-Hydroxy-2-methyl-1-phenylpropan-1-one | Omnicure 1173 | 1.36 |
| Nonionic fluorosurfactant | Zonyl FSN | 0.23 |

The constituents of part B were premixed at room temperature. The resultant portions were blended by stirring in a mixing ratio of 50% by volume of part A to 50% by volume of part B, or 52.63% by weight of part A to 47.37% by weight of part B.

Example 2: Production of a Fluid Based on a Thiol-Ene-(Meth)Acrylate Hybrid System

|  |  | % by wt. |
|---|---|---|
| Trimethylolpropane trimercaptopropionate | TPMP | 12.59 |
| Butane-1,4-diol divinyl ether | BDDVE | 6.78 |
| Dipropylene glycol diacrylate | DPGDA | 77.48 |
| 2,6-Di-tert-butyl-4-methylphenol | BHT | 0.97 |
| 2-(2H-Benzotriazol-2-yl)-4-(1,1,3,3-tetramethylbutyl)phenol | Tinuvin 329 | 0.24 |
| 2-Hydroxy-2-methyl-1-phenylpropan-1-one | Omnicure 1173 | 0.48 |
| 2,4,6-Trimethylbenzoyldiphenylphosphine oxide | Omnirad TPO | 1.45 |

The main components of the fluid were mixed, and the additives were then added while stirring.

Example 3: Production of a Fluid Based on a Thiol-Ene-(Meth)Acrylate Hybrid System

|  |  | % by wt. |
|---|---|---|
| Dimercaptodiethyl sulfide | DMDS | 8.48 |
| Trivinylcyclohexane | TVCH | 5.98 |
| Bis(2-methacryloylthioethyl) sulfide | S-2EG | 81.93 |
| 2,6-Di-tert-butyl-4-methylphenol | BHT | 0.96 |
| 2-(2H-Benzotriazol-2-yl)-4-(1,1,3,3-tetramethylbutyl)phenol | Tinuvin 329 | 0.24 |
| 2-Hydroxy-2-methyl-1-phenylpropan-1-one | Omnicure 1173 | 0.96 |
| 2,4,6-Trimethylbenzoyldiphenylphosphine oxide | Omnirad TPO | 1.45 |

The main components of the fluid were mixed, and the additives were then added while stirring.

Example 4: Production of a Fluid Based on an Epoxythiol-(Meth)Acrylate Hybrid System

|  |  | % by wt. |
|---|---|---|
| Part A |  |  |
| Bisphenol F diglycidyl ether | Rütapox 0158 | 19.10 |
| Bisphenol A diglycidyl ether | Rütapox 0162 | 19.10 |
| 3-Glycidyloxypropyltrimethoxysilane | GPTS | 1.15 |
| Dipropylene glycol diacrylate | DPGDA | 30.56 |
| 2,6-Di-tert-butyl-4-methylphenol | BHT | 0.38 |
| 2-Hydroxy-2-methyl-1-phenylpropan-1-one | Omnicure 1173 | 1.14 |
| Part B |  |  |
| Pentaerythritol tetrakis(3-mercaptopropionate) | PETMP | 28.53 |
| 1,4-Diazabicyclo[2.2.2]octane | DABCO | 0.04 |

The constituents of part A and part B were each mixed at room temperature by stirring. The resultant portions were blended by stirring in a mixing ratio of 71.43% by weight of part A to 28.57% by weight of part B.

Example 5. Production of an Epoxy(Meth)Acrylate Hybrid System

|  |  | % by wt. |
|---|---|---|
| Part A |  |  |
| 3,4-Epoxycyclohexylmethyl 3,4-epoxycyclohexanecarboxylate | Celloxide 2021P | 20.00 |
| Bis((3,4-epoxycyclohexyl)methyl) adipate | ERL 4299 | 20.00 |
| 2-Ethylhexane-1,3-diol | EHD | 8.00 |
| 3-Glycidyloxypropyltrimethoxysilane | GPTS | 0.40 |
| Triarylsulfonium hexafluoroantimonate, about 50% in propylene carbonate | Cyracure 6976 | 1.60 |
| Part B |  |  |
| Tripropylene glycol diacrylate | TPGDA | 48.78 |
| 2,6-Di-tert-butyl-4-methylphenol | BHT | 0.24 |
| 2-Hydroxy-2-methyl-1-phenylpropan-1-one | Omnicure 1173 | 0.98 |

The constituents of part A and part B were each mixed at room temperature by stirring. The resultant portions were blended by stirring in a mixing ratio of 50.0% by weight of part A to 50.0% by weight of part B, although the proportion of part B (acrylate content) may be varied on account of the independence of the two reaction systems.

Example 6: Production of an Epoxythiol-Thiol/Ene Hybrid System Comprising a Photolatent Base

| | | % by wt. |
|---|---|---|
| Part A | | |
| Bisphenol F diglycidyl ether | Rütapox 0158 | 23.98 |
| Bisphenol A diglycidyl ether | Rütapox 0162 | 15.99 |
| 3-Glycidyloxypropyltrimethoxysilane | | 1.20 |
| 1,3,5-Triallyl-1,3,5-triazine-2,4,6-(1H,3H,5H)-trione | TTT | 11.99 |
| 2-Hydroxy-2-methyl-1-phenylpropan-1-one | Omnicure 1173 | 2.40 |
| Part B | | |
| GST/XDI prepolymer (100 parts 4-mercapto-methyl-3,6-dithiaoctane-1,8-dithiol (GST) + 16 parts xylylene 1,3-diisocyanate (XDI) | | 42.73 |
| 1-Benzyloctahydropyrrolo[1,2-a]pyrimidine | CGI 90 | 1.71 |

The constituents of part A and part B were each mixed at room temperature by stirring. The resultant portions were blended by stirring in a mixing ratio of 55.56% by weight of part A to 44.44% by weight of part B.

Example 7: Production of an Epoxythiol-Thiol/Ene Hybrid System Comprising a Photolatent Base

| | | % by wt. |
|---|---|---|
| Part A | | |
| Bisphenol F diglycidyl ether | Rütapox 0158 | 23.48 |
| Bisphenol A diglycidyl ether | Rütapox 0162 | 15.65 |
| 3-Glycidyloxypropyltrimethoxysilane | GPTS | 1.17 |
| 1,3,5-Triallyl-1,3,5-triazine-2,4,6-(1H,3H,5H)-trione | TTT | 13.70 |
| 2-Hydroxy-2-methyl-1-phenylpropan-1-one | Omnicure 1173 | 3.13 |
| Part B | | |
| Pentaerythritol tetrakis(3-mercaptopropionate) | PETMP | 40.82 |
| 1-Benzyloctahydropyrrolo[1,2-a]pyrimidine | CGI 90 | 2.04 |

The constituents of part A and part B were each mixed at room temperature by stirring. The resultant portions were blended by stirring in a mixing ratio of 57.14% by weight of part A to 42.86% by weight of part B.

Example 8: Production of an Epoxythiol-(Meth)Acrylate Hybrid System Comprising a Photolatent Base

| | | % by wt. |
|---|---|---|
| Part A | | |
| Bisphenol F diglycidyl ether | Rütapox 0158 | 20.13 |
| Bisphenol A diglycidyl ether | Rütapox 0162 | 20.13 |
| 3-Glycidyloxypropyltrimethoxysilane | GPTS | 1.21 |
| Dipropylene glycol diacrylate | DPGDA | 24.15 |
| 2,6-Di-tert-butyl-4-methylphenol | BHT | 0.40 |
| 2-Hydroxy-2-methyl-1-phenylpropan-1-one | Omnicure 1173 | 2.01 |
| Part B | | |
| Pentaerythritol tetrakis(3-mercaptopropionate) | PETMP | 30.45 |
| 1-Benzyloctahydropyrrolo[1,2-a]pyrimidine | CGI 90 | 1.52 |

The constituents of part A and part B were each mixed at room temperature by stirring. The resultant portions were blended by stirring in a mixing ratio of 68.03% by weight of part A to 31.97% by weight of part B.

II Polymerization of the Fluids of the Disclosure

For polymerization of the fluids of the disclosure, a thin film of each fluid was exposed using the parameters listed in table 2 under air.

TABLE 2

Parameters for polymerization of the fluids of the disclosure.

| Example | UV-LED, wavelength, nm | UV-LED, power, mW/cm$^2$ | Exposure time, s | Curing of the epoxy component |
|---|---|---|---|---|
| 1 | 365 | 80 | 90 | — |
| 2 | 365 | 200 | 60 | — |
| 3 | 365 | 400 | 90 | — |
| 4 | 365 | 100 | 60 | Thermal epoxy curing: 15 h at 25° C./1 h at 80° C. |
| 5 | 365 | 100 | 60 | Simultaneous cationic epoxy curing |
| 6 | 365 | 200 | 60 | Photoactivation of the amine-catalyzed epoxy curing |
| 7 | 365 | 200 | 60 | Photoactivation of the amine-catalyzed epoxy curing |
| 8 | 365 | 100 | 60 | Photoactivation of the amine-catalyzed epoxy curing |

III Characterization of the Fluids of the Disclosure

IIIa Determination of the Stability of the Fluids of the Disclosure at Room Temperature In order to determine the stability of the fluids from examples 1, these were stored in closed containers under an air atmosphere in the dark at room temperature, and the flow characteristics were assessed at regular intervals.

IIIb Determination of the Viscosity of the Fluids of the Disclosure

The viscosity of the fluids was determined with the aid of the C-VOR rotary viscometer from Bohlin Instruments in a cone-plate arrangement (1° geometry) at a shear rate of 100 s$^1$.

IIIc Determination of the Refractive Indices of the Fluids of the Disclosure

A determination of the refractive indices and of the dispersion was conducted with the aid of the Abbe 60/ED Abbe refractometer from Bellingham & Stanley and different spectral lamps (Na, Hg, Cd, He).

TABLE 3

Properties of the fluids of the disclosure

| Example | Viscosity, 25° C. mPas | Refractive index $n_e^{21}$, fluid | Refractive index $n_e^{21}$, polymer | Storage stability (25° C., darkness), months |
|---|---|---|---|---|
| 2 | 21 | 1.4632 | 1.5066 | >6 |
| 3 | 12 | 1.5666 | 1.6274 | >6 |
| 6 | not determined | not determined | 1.628 | not determined |

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. An inkjet method of producing a spectacle lens, comprising at least:
   a) providing at least one fluid;
   b) providing a substrate to be printed on or providing a support material to be printed on and subsequently removed;
   c) applying at least one volume element of the at least one fluid from step a) to the substrate or support material from step b);
   d) activating a reaction within the at least one volume element from step c);
   e) applying at least one further volume element of the at least one fluid from step a) adjacent to and/or adjoining the at least one volume element from step c) to form at least two adjacently and/or mutually adjoiningly applied volume elements;
   f) coalescing, bonding, wetting, and/or contacting the at least two adjacently and/or mutually adjoiningly applied volume elements from step e) to form a homogeneous volume composite in which the reaction is not yet fully concluded;
   g) repeating steps e) and f); and
   h) concluding the reaction,
   wherein
      the coalescing, bonding, wetting, and/or contacting from step f) is effected with transmission of a reactivity between the adjacently and/or mutually adjoiningly applied volume elements and with transformation of the homogeneous volume composite to a final volume composite, wherein
      the at least one fluid from step a) contains:
      at least one hybrid system,
      at least one system containing at least one photolatent catalyst,
      at least one hybrid system containing at least one photolatent catalyst, or
      at least one thiol-ene system, and
   wherein repeating steps e) and f) includes effecting the transmission of the reactivity between adjacently applied and/or between mutually adjoining homogeneous volume elements of the homogeneous volume composite in which the reaction is not yet fully concluded in a repeated step f) before the reaction is concluded in an adjacently applied and/or mutually adjoining homogeneous volume element from which the reactivity has been transmitted to the homogenous volume composite.

2. The inkjet method as claimed in claim 1, wherein the reactivity is transmitted without reactivation.

3. An inkjet method of producing a spectacle lens, comprising at least:
   a) providing at least one fluid;
   b) providing a substrate to be printed on or providing a support material to be printed on and subsequently removed;
   c) applying at least two adjacent and/or mutually adjoining volume elements of the at least one fluid from step a) to the substrate or support material from step b);
   d) coalescing, bonding, wetting, and/or contacting the at least two adjacently and/or mutually adjoiningly applied volume elements from step c);
   e) activating a reactivity of the at least one fluid to initiate a reaction;
   f) applying at least one further volume element of the at least one fluid from step a);
   g) coalescing, bonding, wetting, and/or contacting the at least two adjacently and/or mutually adjoiningly applied volume elements from step d) with the at least one further volume element from step f) to form a homogeneous volume composite in which the reaction is not yet fully concluded;
   h) repeating steps f) and g) or repeating steps e), f) and g); and
   i) concluding the reaction,
   wherein
      the coalescing, bonding, wetting, and/or contacting from steps d) and g) is effected with transmission of the reactivity between the adjacently and/or mutually adjoiningly applied volume elements and with transformation of the homogeneous volume composite to a final volume composite, wherein
      the at least one fluid from step a) contains:
      at least one hybrid system,
      at least one system containing at least one photolatent catalyst,
      at least one hybrid system containing at least one photolatent catalyst, or
      at least one thiol-ene system, and
   wherein repeating steps e) and f) or steps e), f) and g) includes effecting the transmission of the reactivity between adjacently applied and/or between mutually adjoining homogeneous volume elements of the homogeneous volume composite in which the reaction is not yet fully concluded in a repeated step f) before the reaction is concluded in an adjacently applied and/or mutually adjoining homogeneous volume element from which the reactivity has been transmitted to the homogenous volume composite.

4. The inkjet method as claimed in claim 1, wherein the at least one hybrid system is selected from the group consisting of:

at least one thiol-ene-(meth)acrylate hybrid system,
at least one epoxythiol-(meth)acrylate hybrid system, and
at least one epoxy-(meth)acrylate hybrid system.

5. The inkjet method as claimed in claim 1, wherein the at least one system containing the at least one photolatent catalyst is selected from the group consisting of:
at least one epoxy-polyol system containing at least one photolatent acid, and
at least one epoxythiol system containing at least one photolatent base.

6. The inkjet method as claimed in claim 1, wherein the at least one hybrid system containing the at least one photolatent catalyst is selected from the group consisting of:
at least one epoxythiol-thiol/ene hybrid system containing at least one photolatent base, and
at least one epoxythiol-(meth)acrylate hybrid system containing at least one photolatent base.

7. The inkjet method as claimed in claim 1, wherein the at least one fluid comprises the at least one thiol-ene system.

8. An inkjet method of producing a spectacle lens, comprising at least:
a) providing at least one fluid;
b) providing a substrate to be printed on or providing a support material to be printed on and subsequently removed;
c) applying at least one volume element of the at least one fluid from step a) to the substrate or support material from step b);
d) activating a reaction within the at least one volume element from step c);
e) applying at least one further volume element of the at least one fluid from step a) adjacent to and/or adjoining the at least one volume element from step c) to form at least two adjacently and/or mutually adjoiningly applied volume elements;
f) coalescing, bonding, wetting, and/or contacting the at least two adjacently and/or mutually adjoiningly applied volume elements from step e) to form a homogeneous volume composite in which the reaction is not yet fully concluded;
g) repeating steps e) and f); and
h) concluding the reaction,
wherein
the coalescing, bonding, wetting, and/or contacting from step f) is effected with transmission of a reactivity between the adjacently and/or mutually adjoiningly applied volume elements and with transformation of the homogeneous volume composite to a final volume composite, wherein
the at least one fluid from step a) contains at least one photolatent catalyst, and
wherein repeating steps e) and f) includes effecting the transmission of the reactivity between adjacently applied and/or between mutually adjoining homogeneous volume elements of the homogeneous volume composite in which the reaction is not yet fully concluded in a repeated step f) before the reaction is concluded in an adjacently applied and/or mutually adjoining homogeneous volume element from which the reactivity has been transmitted to the homogenous volume composite.

9. An inkjet method of producing a spectacle lens, comprising at least:
a) providing at least one fluid;
b) providing a substrate to be printed on or providing a support material to be printed on and subsequently removed;
c) applying at least two adjacent and/or mutually adjoining volume elements of the at least one fluid from step a) to the substrate or support material from step b);
d) coalescing, bonding, wetting, and/or contacting the at least two adjacently and/or mutually adjoiningly applied volume elements from step c);
e) activating a reactivity of the at least one fluid to initiate a reaction;
f) applying at least one further volume element of the at least one fluid from step a);
g) coalescing, bonding, wetting, and/or contacting the at least two adjacently and/or mutually adjoiningly applied volume elements from step d) with the at least one further volume element from step f) to form a homogeneous volume composite in which the reaction is not yet fully concluded;
h) repeating steps f) and g) or repeating steps e), f) and g); and
i) concluding the reaction,
wherein
the coalescing, bonding, wetting, and/or contacting from steps d) and g) is effected with transmission of the reactivity between the adjacently and/or mutually adjoining applied volume elements and with transformation of the homogeneous volume composite to a final volume composite, wherein
the at least one fluid from step a) contains at least one photolatent catalyst, and
wherein repeating steps e) and f) or steps e), f) and g) includes effecting the transmission of the reactivity between adjacently applied and/or between mutually adjoining homogeneous volume elements of the homogeneous volume composite in which the reaction is not yet fully concluded in a repeated step f) before the reaction is concluded in an adjacently applied and/or mutually adjoining homogeneous volume element from which the reactivity has been transmitted to the homogenous volume composite.

10. The inkjet method as claimed in claim 8, wherein the at least one photolatent catalyst is at least one photolatent acid or at least one photolatent base.

11. The inkjet method as claimed in claim 10, wherein the at least one fluid comprises:
the at least one photolatent acid in a total proportion from a range from 0.001% by weight to 2% by weight, based on a total weight of the at least one fluid, or
the at least one photolatent base in a total proportion from a range from 0.001% by weight to 5.0% by weight, based on the total weight of the at least one fluid.

12. The inkjet method as claimed in claim 1, wherein the substrate is a finished spectacle lens or a thin lens.

13. The inkjet method as claimed in claim 1, wherein the activation is effected by means of actinic radiation and/or by means of thermal energy.

14. The inkjet method as claimed in claim 1, wherein the reactivity is transmitted:
in an x and/or y direction and/or in a z direction, or
independently of the x and/or y direction and independently of the z direction.

15. The inkjet method as claimed in claim 1, wherein the coalescing, bonding, wetting, and/or contacting the at least two adjacently and/or mutually adjoiningly applied volume elements is effected:
laterally between volume elements adjacently applied and/or mutually adjoining in an x and/or y direction,
in a z direction between volume elements adjacently applied and/or mutually adjoining, or independently of the x and/or y direction and independently of the z direction.

16. An inkjet method of producing a spectacle lens, comprising at least:
    a) providing a substrate to be printed on or providing a support material to be printed on and subsequently removed;
    b) providing at least one fluid;
    c) applying at least two adjacent and/or mutually adjoining volume elements containing the at least one fluid from step b) to the substrate or support material from step a);
    d) coalescing, bonding, wetting, and/or contacting the at least two adjacently applied and/or mutually adjoining volume elements from step c) with transformation of the at least two adjacently applied and/or mutually adjoining volume elements to a volume composite;
    e) activating a reaction of the fluid within the volume composite from step d) and commencement of the reaction with transformation of the volume composite into a homogeneous volume composite in which the reaction is not yet fully concluded;
    f) applying at least one further volume element containing the at least one fluid from step b) adjacent to and/or adjoining the homogeneous volume composite from step e);
    g) coalescing, bonding, wetting, and/or contacting the at least one further adjacently applied and/or mutually adjoining volume element from step f) with the homogeneous volume composite from step e) to extend the homogeneous volume composite;
    h) repeating steps f) and g); and
    i) concluding the reaction,
    wherein
        the coalescing, bonding, wetting, and/or contacting from steps d) and g) is effected with transmission of a reactivity between the adjacently and/or mutually adjoiningly applied volume elements and with transformation of the homogeneous volume composite to a final volume composite, wherein
        the fluid from step a) contains:
            at least one hybrid system,
            at least one system containing at least one photolatent catalyst,
            at least one hybrid system containing at least one photolatent catalyst, or
            at least one thiol-ene system, and
        wherein repeating steps e) and f) includes effecting the transmission of the reactivity between adjacently applied and/or between mutually adjoining homogeneous volume elements of the homogeneous volume composite in which the reaction is not yet fully concluded in a repeated step f) before the reaction is concluded in an adjacently applied and/or mutually adjoining homogeneous volume element from which the reactivity has been transmitted to the homogenous volume composite.

17. The inkjet method as claimed in claim 16, wherein the reactivity is transmitted without reactivation.

18. The inkjet method as claimed in claim 16, wherein the reaction in the volume composite has not yet commenced.

19. The inkjet method as claimed in claim 16, wherein the reaction commences as a result of activation by means of actinic radiation or by means of thermal energy.

20. The inkjet method as claimed in claim 16, wherein the at least two adjacently applied and/or mutually adjoining volume elements are transformed to the volume composite:
    a) laterally between volume elements adjacently applied and/or mutually adjoining in an x and/or y direction and the volume composite formed in the x and/or y direction is extended by volume elements applied in a z direction, or
    b) in the z direction between volume elements adjacently applied and/or mutually adjoining and the volume composite formed in the z direction is extended by volume elements applied in the x and/or y direction, or
    c) independently of the x and/or y direction and independently of the z direction.

21. The inkjet method as claimed in claim 16, wherein extending a volume composite V present in an x and/or y direction or a homogeneous volume composite Vh present in the x and/or y direction comprises:
    a) integration of volume elements applied in a z direction into the volume composite V present in the x and/or y direction or into the homogeneous volume composite Vh present in the x and/or y direction, or
    b) lateral transformation in the x and/or y direction of volume elements applied in the z direction to the volume composite V already present in the x and/or y direction or to the homogeneous volume composite Vh already present in the x and/or y direction to a further volume composite V1 or to a further homogeneous volume composite Vh1 and subsequent integration of the further volume composite V1 or the further homogeneous volume composite Vh1 into the volume composite V already present in the x and/or y direction or into the homogeneous volume composite Vh already present in the x and/or y direction, respectively, or
    c) integration of the volume elements applied in the z direction into the volume composite V present in the x and/or y direction or into the volume composite Vh present in the x and/or y direction and simultaneous transformation of the volume elements applied in the z direction to the further volume composite V1 or to the further homogeneous volume composite Vh1, respectively, or
    wherein the extending the volume composite V present in the z direction or of the homogeneous volume composite Vh present in the z direction comprises:
    d) integration of volume elements applied in the x and/or y direction into the volume composite V present in the z direction or into the homogeneous volume composite Vh present in the z direction, or
    e) transformation in the z direction of volume elements applied in the x and/or y direction to the volume composite V already present in the z direction or to the homogeneous volume composite Vh already present in the z direction to the further volume composite V1 or to the further homogeneous volume composite Vh1 and subsequent integration of the further volume composite V1 or the further homogeneous volume composite Vh1 into the volume composite V already present in the z direction or into the homogeneous volume composite Vh already present in the z direction, respectively, or
    f) integration of volume elements applied in the x and/or y direction into the volume composite V already present in the z direction or the volume composite Vh already present in the z direction and simultaneous conversion of the volume elements applied in the x and/or y direction to the volume composite V1 or to the homogeneous volume composite Vh1.

22. The inkjet method as claimed in claim 16, wherein the volume composite results from the coalescing, bonding, wetting, and/or contacting of at least two mutually adjoining and/or adjacently applied volume composites or from the coalescing, bonding, wetting, and/or contacting of at least one volume element and at least one adjoining and/or adjacently applied volume composite.

23. The inkjet method as claimed in claim 16, wherein the homogeneous volume composite is formed when the reaction:
  a) within a respective volume element and between adjacently applied and/or mutually adjoining volume elements, or
  b) within a respective volume composite and the reaction between the respective volume composite and at least one volume element, and the reaction within the at least one volume element, or
  c) within adjacently applied and/or mutually adjoining volume composites and between the adjacently applied and/or mutually adjoining volume composites, has not fully concluded.

24. The inkjet method as claimed in claim 16, wherein the final volume composite is formed when the reaction:
  a) within a volume element is at first not fully concluded, the reaction between adjacently applied and/or mutually adjoining volume elements is not fully concluded and the reactivity is transmitted between the adjacently applied and/or mutually adjoining volume elements, or
  b) within the homogeneous volume composite is at first not fully concluded, the reaction between adjacently applied and/or mutually adjoining homogeneous volume composites is at first not fully concluded and the reactivity is transmitted between the adjacently applied and/or mutually adjoining homogeneous volume composites, or
  c) within the homogeneous volume composite is at first not fully concluded, the reaction between the homogeneous volume composite and at least one adjacently applied and/or adjoining volume composite is at first not fully concluded, the reactivity is transmitted between the homogeneous volume composite and the at least one adjacently applied and/or adjoining volume composite, or
  d) within the volume element is at first not fully concluded, the reaction between the volume element and an adjacently applied and/or adjoining volume composite is at first not fully concluded, and the reactivity is transmitted from the volume element to the adjacently applied and/or adjoining volume composite, or
  e) within the homogeneous volume composite is at first not fully concluded, the reaction between the homogeneous volume composite and at least one adjacently applied and/or adjoining volume element is at first not fully concluded, and the reactivity is transmitted from the homogeneous volume composite to the at least one adjacently applied and/or adjoining volume element, or
  f) within the homogeneous volume composite and within at least one adjacently applied and/or adjoining volume element is at first not fully concluded, the reaction between the homogeneous volume composite and the at least one adjacently applied and/or adjoining volume element is at first not fully concluded, and the reactivity is transmitted between the homogeneous volume composite and the at least one adjacently applied and/or adjoining volume element, and the reaction is concluded after transmission of the reactivity.

25. The method as claimed in claim 16, wherein the reactivity is transmitted:
  a) in an x and/or y direction and/or in a z direction, or
  b) independently of the x and/or y direction and independently of the z direction.

26. The method as claimed in claim 16, wherein the substrate, after formation of the final volume, remains bonded to the final volume composite or is separated from the final volume composite.

27. The method as claimed in claim 16, wherein the at least one fluid contains the hybrid system.

28. The method as claimed in claim 27, wherein the hybrid system is selected from the group consisting of a thiol-ene-(meth)acrylate hybrid system, an epoxythiol-(meth)acrylate hybrid system, an epoxy-(meth)acrylate hybrid system, an epoxythiol-thiol/ene hybrid system containing at least one photolatent base, and an epoxythiol-(meth)acrylate hybrid system containing at least one photolatent base.

29. The method as claimed in claim 16, wherein the at least one fluid contains the thiol-ene system.

* * * * *

UNITED STATES PATENT AND TRADEMARK OFFICE
CERTIFICATE OF CORRECTION

PATENT NO. : 11,794,428 B2
APPLICATION NO. : 17/860408
DATED : October 24, 2023
INVENTOR(S) : Weippert et al.

Page 1 of 2

It is certified that error appears in the above-identified patent and that said Letters Patent is hereby corrected as shown below:

In the Specification

In Column 36, Line 59: change "h☐" to -- h$v$ --

In Column 39, Line 57: change "0.1 Fein' to 20 Fein'" to -- 0.1 J/cm$^2$ to 20 J/cm$^2$ --

In Column 39, Line 58: change "0.2 Fein' to 5 Fein'" to -- 0.2 J/cm$^2$ to 5 J/cm$^2$ --

In Column 39, Line 59: change "0.5 Rem' to 2 Rem'" to -- 0.5 J/cm$^2$ to 2 J/cm$^2$ --

In Column 41, Line 6: change "h☐" to -- h$v$ --

In Column 41, Line 60: change "13606:2013-10" to -- 13666:2013-10 --

In Column 41, Line 67: change "nay" to -- may --

In Column 42, Line 6: change "power lenses degressive-power lenses" to -- power lenses or degressive-power lenses --

In Column 42, Line 8: change "8.1.6" to -- 8.3.6 --

In Column 43, Line 10: change "corn positions" to -- compositions --

In Column 43, Line 25: change "Above ail" to -- Above an --

In Column 43, Line 51: change "roughness of" to -- roughness Ra of --

In Column 43, Line 55: change "car" to -- can --

Signed and Sealed this
Fifth Day of December, 2023

Katherine Kelly Vidal
*Director of the United States Patent and Trademark Office*

CERTIFICATE OF CORRECTION (continued)
U.S. Pat. No. 11,794,428 B2

In Column 43, Line 56: change "ectometry" to -- deflectometry --

In Column 44, Line 31: change "Konzeption and Entwicklung" to -- Konzeption und Entwicklung --